(12) United States Patent
Hutcherson, II et al.

(10) Patent No.: US 11,566,974 B2
(45) Date of Patent: Jan. 31, 2023

(54) SYSTEMS AND METHODS FOR ANALYZING MACHINE PERFORMANCE

(71) Applicant: Georgia-Pacific LLC, Atlanta, GA (US)

(72) Inventors: David Walter Hutcherson, II, Conley, GA (US); Samuel Lee Coyne, Smyrna, GA (US); Roshan Shah, Sandy Springs, GA (US)

(73) Assignee: Georgia-Pacific LLC, Atlanta, GA (US)

( * ) Notice: Subject to any disclaimer, the term of this patent is extended or adjusted under 35 U.S.C. 154(b) by 0 days.

(21) Appl. No.: 17/503,165

(22) Filed: Oct. 15, 2021

(65) Prior Publication Data

US 2022/0120639 A1 Apr. 21, 2022

Related U.S. Application Data

(60) Provisional application No. 63/093,137, filed on Oct. 16, 2020.

(51) Int. Cl.
*G06F 11/30* (2006.01)
*G01M 99/00* (2011.01)
*G06N 20/00* (2019.01)
*G06F 16/28* (2019.01)

(52) U.S. Cl.
CPC ......... *G01M 99/005* (2013.01); *G06F 16/285* (2019.01); *G06N 20/00* (2019.01)

(58) Field of Classification Search
CPC .................................................. G01M 99/005
See application file for complete search history.

(56) References Cited

U.S. PATENT DOCUMENTS

| 8,450,984 | B2 | 5/2013 | Sandrana et al. | |
|---|---|---|---|---|
| 10,351,150 | B1 | 7/2019 | Lederman et al. | |
| 2006/0265153 | A1 | 11/2006 | Astley et al. | |
| 2009/0100293 | A1* | 4/2009 | LaComb | G05B 23/0229 714/26 |
| 2011/0013479 | A1 | 1/2011 | Chaudhuri et al. | |
| 2012/0105021 | A1 | 5/2012 | Sandrana et al. | |
| 2019/0188110 | A1* | 6/2019 | Ueyama | G06F 11/3433 |
| 2021/0326759 | A1 | 10/2021 | Ardel et al. | |

OTHER PUBLICATIONS

U.S. Appl. No. 17/019,108, Notice of Allowance dated Dec. 3, 2021, 14 pages.
U.S. Appl. No. 17/019,108, Non-Final Office Action dated Aug. 9, 2021, 11 pages.

* cited by examiner

*Primary Examiner* — Phuong Huynh

(57) ABSTRACT

Methods, systems, and devices for analyzing vibration data to determine and mitigate an occurrence of an anomaly at an industrial asset. A device may obtain and preprocess vibration data, which may include grouping the vibration data according to respective time intervals, and the device may filter the grouped data to obtain the most recent measurement readings. The device may use an anomaly detection algorithm to detect outliers in the datasets for each group of vibration data and compare an amplitude of the outliers to a threshold for the respective group. The device may determine that the vibration data includes an anomaly based on quantities of outliers in first and second subsets of the vibration data that are within a detection window. The device may generate a report including an indication of the anomaly and transmit the report to an operator or engineer for the facility.

30 Claims, 16 Drawing Sheets

| sensor1 | sensor2 | sensor3 | sensor4 | sensor5 | indicatortype | datetime |
|---|---|---|---|---|---|---|
| 0.10554 | 0.4642 | 0.12533 | 0.70926 | 0.82532 | VibrationOverall | 3/21/2020 1:00 |
| 0.32036 | 0.45234 | 0.45344 | 0.08891 | 0.51653 | VibrationOverallPeakAccel | 3/21/2020 2:00 |
| 0.43314 | 0.02583 | 0.20735 | 0.04181 | 0.64417 | VibrationOverallPeakAccel | 3/21/2020 3:00 |
| 0.01089 | 0.67441 | 0.676 | 0.88644 | 0.57448 | VibrationOverallPeakAccel | 3/21/2020 4:00 |
| 0.22998 | 0.73338 | 0.2652 | 0.52912 | 0.5206 | VibrationOverall | 3/21/2020 5:00 |
| 0.2786 | 0.76568 | 0.31582 | 0.17866 | 0.18399 | VibrationOverall | 3/21/2020 6:00 |
| 0.82775 | 0.98962 | 0.79182 | 0.79975 | 0.34587 | VibrationOverallPeakAccel | 3/21/2020 7:00 |
| 0.09774 | 0.39714 | 0.68831 | 0.56275 | 0.41736 | VibrationOverall | 3/21/2020 8:00 |
| 0.14463 | 0.86171 | 0.7449 | 0.54426 | 0.95462 | VibrationOverall | 3/21/2020 9:00 |
| 0.90149 | 0.57775 | 0.9598 | 0.00133 | 0.94946 | VibrationOverall | 3/21/2020 10:00 |
| 0.22498 | 0.16115 | 0.02977 | 0.97432 | 0.84533 | VibrationOverall | 3/21/2020 11:00 |
| 0.80726 | 0.40668 | 0.76345 | 0.20815 | 0.94086 | VibrationOverallPeakAccel | 3/21/2020 12:00 |
| 0.93015 | 0.0563 | 0.73593 | 0.72772 | 0.46786 | VibrationOverallPeakAccel | 3/21/2020 14:00 |
| 0.81426 | 0.35649 | 0.0968 | 0.07262 | 0.69531 | VibrationOverall | 3/21/2020 15:00 |
| 0.39408 | 0.83432 | 0.0993 | 0.61362 | 0.88842 | VibrationOverallPeakAccel | 3/21/2020 16:00 |
| 0.57226 | 0.52638 | 0.43107 | 0.64962 | 0.77809 | VibrationOverallPeakAccel | 3/21/2020 17:00 |
| 0.09439 | 0.34972 | 0.64172 | 0.20399 | 0.91086 | VibrationOverallPeakAccel | 3/21/2020 18:00 |
| 0.62828 | 0.67529 | 0.37085 | 0.53699 | 0.52484 | VibrationOverallPeakAccel | 3/21/2020 19:00 |
| 0.47488 | 0.36802 | 0.30645 | 0.97191 | 0.3996 | VibrationOverallPeakAccel | 3/21/2020 20:00 |

*FIG. 2*

| facility | tag_name | short_term_num_outliers | long_term_num_outliers | report_date | facility_id | indicator |
|---|---|---|---|---|---|---|
| Facility XYZ | sensor1 | 9 | 5 | 3/22/2020 15:39 | 141 | VibrationOverallPeakAccel |
| Facility XYZ | sensor2 | 3 | 4 | 3/23/2020 15:39 | 141 | VibrationOverallPeakAccel |
| Facility XYZ | sensor3 | 0 | 4 | 3/24/2020 15:39 | 141 | VibrationOverall |
| Facility XYZ | sensor4 | 4 | 4 | 3/25/2020 15:39 | 141 | VibrationOverall |
| Facility XYZ | sensor5 | 6 | 3 | 3/26/2020 15:39 | 141 | VibrationOverall |
| Facility XYZ | sensor6 | 1 | 5 | 3/27/2020 15:39 | 141 | VibrationOverallPeakAccel |
| Facility XYZ | sensor7 | 3 | 5 | 3/28/2020 15:39 | 141 | VibrationOverallPeakAccel |
| Facility XYZ | sensor8 | 17 | 11 | 3/29/2020 15:39 | 141 | VibrationOverallPeakAccel |

*FIG. 7*

SYSTEMS AND METHODS FOR ANALYZING MACHINE PERFORMANCE

RELATED APPLICATIONS

This application claims priority to U.S. Patent Application No. 63/093,137, filed Oct. 16, 2020, which is incorporated herein in its entirety by reference.

TECHNICAL FIELD

The present disclosure relates generally to systems and methods for analyzing performance of industrial equipment and, more particularly, to systems and methods for analyzing vibration data to determine and mitigate an occurrence of an anomaly at an industrial asset.

DESCRIPTION OF THE RELATED TECHNOLOGY

In some cases, an industrial mill or factory may include numerous machines and other equipment. During operation, this equipment may vibrate, which may indicate that the equipment has, over time, incurred wear and tear or other damage (e.g., potentially causing failures, etc.). If this goes undetected, the wear and tear or other damage may cause major issues that may then lead to unplanned events, such as a shutdown or other significant operational events. Such unplanned events are undesirable because they may lead to time and/or monetary losses for an owner and/or operator of the equipment. Accordingly, techniques have been implemented to monitor such vibrations to attempt to control for and/or prevent excessive degradation of equipment so as to avoid these potentially significant unplanned events. As such, many industrial machines include sensors that measure vibration and other physical phenomena.

Some techniques for monitoring these vibration measurements may include, for example, a system that detects when a sensor reports a vibration metric that satisfies or exceeds a given threshold. However, a given industrial machine may include hundreds of sensors, and a facility may include hundreds of industrial machines. Furthermore, because vibration sensors are subject to a variety of factors that may compromise data integrity, a suitable solution for normalizing vibration data collected from sensors may be desirable. For example, previous solutions may not properly control for noise, time series discrepancies, breakage events, and other factors that influence data analyses.

Moreover, some machines may, at certain times (e.g., periodically or when under high load), substantially increase their operations which may correspondingly generate an increase of a level of vibration measurements. Some techniques for monitoring vibration measurements may flag such a sudden jump in the vibration measurements in this situation as an anomaly or as potentially problematic, but this sudden jump in the vibration measurements may not be indicative of an anomalous or excessive amount of vibrations, and thus reporting this jump may result in a false positive.

Accordingly, the inability to control such factors may render analyses infeasible or inaccurate. In particular, the inability to adequately process vibration data to control for variations may add significant complexity to performing industrial scale assessments of machines in a facility (e.g., because comparisons between given data points may be rendered useless by uncontrolled disparities between the given data points). Thus, techniques are described herein by which operational data may be used to detect potential issues for industrial equipment before a failure or other potentially substantial negative results occur due to the issues (e.g., before excessive degradation occurs, which may in turn cause a catastrophic failure, a temporary shutdown, or lead to the equipment needing to be prematurely replaced).

SUMMARY

The described techniques relate to improved methods, systems, devices, and apparatuses that support analyzing machine performance, such as vibration data, to determine and mitigate an occurrence of an anomaly at an industrial asset. Generally, the described techniques provide for a device such as a server or other computing device to obtain operational data (e.g., vibration data), such as from one or more sensors located on or near one or more machines. For example, the sensors may be configured to collect measurements associated with the machines in a facility (e.g., mill equipment or other machinery in an industrial facility), and the sensors may provide this information (e.g., operational data, including vibration data) to the device. The device may preprocess the obtained vibration data, where preprocessing the data may include converting the vibration data into a format in which data can be grouped according to particular indicator types and grouping the vibration data into one or more groups of vibration data, where each group of vibration data corresponds to a respective time interval.

The device may model the vibration data to identify an anomaly and associate the anomaly with a corresponding sensor and/or machine that may be experiencing an issue. More specifically, modeling the vibration data may include filtering a dataset of operational data to obtain one or more groups of data including vibration measurements obtained from recently performed measurement readings. Modeling the vibration data may further include using an anomaly detection algorithm to detect outliers in the datasets for each of the respective groups of vibration data and, further, comparing an amplitude of each of the outliers to a threshold for the respective group of vibration data to determine a subset of the outliers with the more excessive overall vibration readings.

The device may determine that the vibration data includes an anomaly associated with one or more sensors based on a quantity of outliers of the first subset that are within a detection window relative to a quantity of outliers of the second subset that are within the detection window. In some examples, the device may generate a report including an indication of this anomaly and communicate the report with an operator or engineer for the associated facility. Based on the report, the operator or engineer may confirm whether the device(s) associated with any indicated anomalies are indeed operating abnormally and, if needed, troubleshoot these device(s) or otherwise mitigate potential negative effects of the anomaly.

A method for analyzing machine performance is described. The method may include receiving vibration data points from one or more sensors associated with one or more machines; grouping the vibration data points into a first group of vibration data and a second group of vibration data, where the first group of vibration data includes a first set of the vibration data points associated with a short-term window and the second group of vibration data includes a second set of the vibration data points associated with a long-term window, each of the first group of vibration data and the second group of vibration data corresponding to one of a plurality of time intervals; detecting one or more outliers from the first set of vibration data points and from the second set of vibration data points; determining a first subset of the one or more outliers based on an amplitude of each outlier of the first subset satisfying a first threshold; determining a second subset of the one or more outliers based on an amplitude of each outlier of the second subset satisfying a second threshold; determining that the vibration data points include an anomaly associated with one or more respective sensors of the one or more sensors based on a quantity of outliers of the first subset that are within a detection window relative to a quantity of outliers of the second subset that are within the detection window; and transmitting an indication of the one or more respective sensors associated with the anomaly.

An apparatus for analyzing machine performance is described. The apparatus may include a processor; a memory coupled with the processor; and instructions stored in the memory and executable by the processor to cause the apparatus to receive vibration data points from one or more sensors associated with one or more machines; group the vibration data points into a first group of vibration data and a second group of vibration data, where the first group of vibration data includes a first set of the vibration data points associated with a short-term window and the second group of vibration data includes a second set of the vibration data points associated with a long-term window, each of the first group of vibration data and the second group of vibration data corresponding to one of a plurality of time intervals; detect one or more outliers from the first set of vibration data points and from the second set of vibration data points; determine a first subset of the one or more outliers based on an amplitude of each outlier of the first subset satisfying a first threshold; determine a second subset of the one or more outliers based on an amplitude of each outlier of the second subset satisfying a second threshold; determine that the vibration data points include an anomaly associated with one or more respective sensors of the one or more sensors based on a quantity of outliers of the first subset that are within a detection window relative to a quantity of outliers of the second subset that are within the detection window; and transmit an indication of the one or more respective sensors associated with the anomaly.

Some examples of the methods and apparatuses described herein may further include operations and features for associating a plurality of indicators with each of the vibration data points, each indicator of the plurality of indicators being common to at least a subset of the one or more sensors, where detecting the one or more outliers is based on one or more of the plurality of indicators, respectively, for the first group of vibration data, the second group of vibration data, or both. In some examples of the methods and apparatuses described herein, the plurality of indicators includes one or more of: a sensor type, a corresponding machine, a corresponding facility, an indicator type, a date-time, a sensor measurement, or a combination thereof. In some examples of the methods and apparatuses described herein, the vibration data points include one or more of: a peak velocity value, a peak acceleration value, an overall root mean square value, an overall vibration value, or a combination thereof.

In some examples of the methods and apparatuses described herein, grouping the vibration data into the one or more groups of vibration data includes normalizing the vibration data of the first group of vibration data and the second group of vibration data.

In some examples of the methods and apparatuses described herein, each time interval of the plurality of time intervals corresponds to a respective hour interval.

Some examples of the methods and apparatuses described herein may further include operations and features for modifying the first set of vibration data points, the second set of vibration data points, or both, based on one or more performance parameters, where grouping the vibration data points includes filtering the vibration data points based on the modified data points. In some examples of the methods and apparatuses described herein, the one or more performance parameters include one or more of: a processed sensor measurement, a date-time indicator, an indicator type, a window size parameter, a number of processors, a sensitivity parameter, or a combination thereof.

In some examples of the methods and apparatuses described herein, detecting the one or more outliers include applying an isolation algorithm to the first set of vibration data points of the first group of vibration data and to the second set of vibration data points of the second group of vibration data. In some examples of the methods and apparatuses described herein, determining that the vibration data points include the anomaly is based on a variation between the quantity of outliers of the first subset that are within the detection window and the quantity of outliers of the second subset that are within the detection window. In some examples of the methods and apparatuses described herein, the first threshold is set according to a threshold percentile for the first set of vibration data points of the short-term window and the second threshold is set according to the threshold percentile for the second set of vibration data points of the long-term window.

Some examples of the methods and apparatuses described herein may further include operations and features for collecting the vibration data points at discrete intervals. Some examples of the methods and apparatuses described herein may further include operations and features for associating the vibration data points with respective ones of the one or more sensors based on a key associated with each of the vibration data points. In some examples of the methods and apparatuses described herein, the key includes an indication of a location of a sensor, a sensor function, or both.

Some examples of the methods and apparatuses described herein may further include operations and features for filtering a list of the one or more machines based on determining that the anomaly has not occurred at one or more respective sensors associated with the one or more machines, where the indication of the one or more respective sensors associated with the anomaly is based on the filtered list.

As is understood by a person having ordinary skill in the art, the steps and process shown with respect to FIG. 1 (and those of all other flowcharts and sequence diagrams shown and described herein) may operate concurrently and continuously, are generally asynchronous and independent, and are not necessarily performed in the order shown. Reference has been made herein to one or more Figures; however, such references are included for illustrative purposes and do not place any limitations on any methods, systems and processes described herein.

These and other aspects, features, and benefits of the claimed invention(s) are apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIG. 2 shows an example dataset that supports analyzing machine performance, in accordance with aspects of the present disclosure.

FIG. 7 shows an example report for an example dataset that supports analyzing machine performance, in accordance with aspects of the present disclosure.

DETAILED DESCRIPTION

Figure 1:
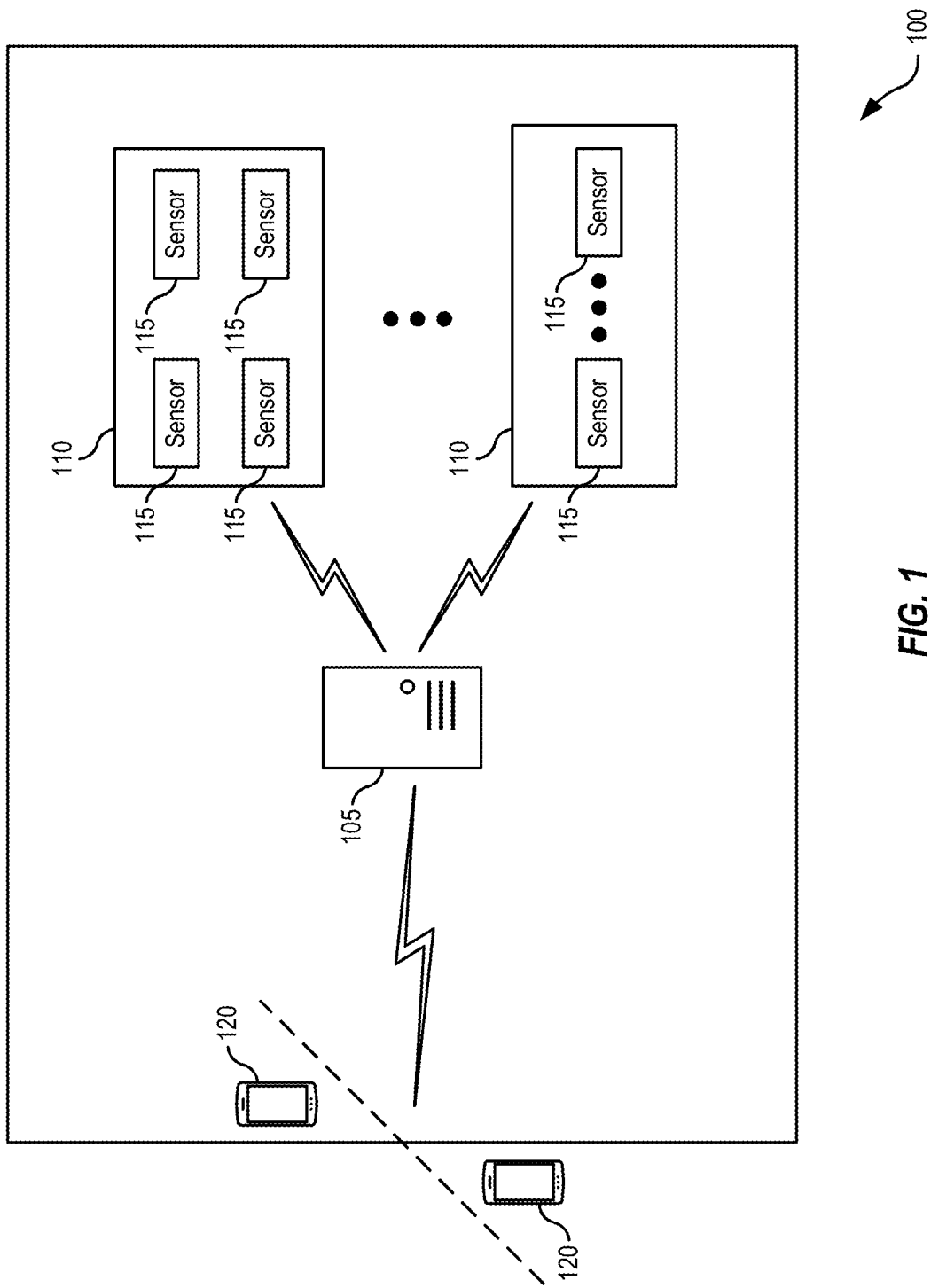
FIG. 1 shows an example of an industrial facility including a device that supports analyzing machine performance, in accordance with aspects of the present disclosure.

To promote an understanding of the principles of the present disclosure, reference is made to the embodiments illustrated in the drawings and specific language is used to describe the same. Nevertheless, it is understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

In some cases, an industrial mill or factory may include numerous machines and other equipment. During operation, this equipment may vibrate, which may indicate that the equipment has, over time, incurred wear and tear or other physical damage (e.g., potentially causing failures, etc.). If this goes undetected, the degradation that causes the vibrations may cause major issues that may then lead to unplanned events, such as a shutdown or other significant operational events. Such unplanned events are undesirable because they may lead to time and/or monetary losses for an owner and/or operator of the equipment. Accordingly, techniques are implemented to monitor such vibrations to attempt to control for and/or prevent excessive degradation of equipment so as to avoid these potentially significant unplanned events. As such, many industrial machines include sensors that measure vibration and other physical phenomena.

Some techniques for monitoring these vibration measurements may include, for example, a system that detects when a sensor reports a vibration metric that satisfies or exceeds a given threshold. However, a given industrial machine may include hundreds of sensors, and a facility may include hundreds (or more) of industrial machines. Furthermore, because vibration sensors are subject to a variety of factors that may compromise data integrity, a suitable solution for normalizing vibration data collected from sensors may be desirable. For example, previous solutions may not properly control for noise, time series discrepancies, breakage events, and other factors that influence data analyses.

Moreover, some machines may at certain times (e.g., periodically or when under high load) substantially increase their operations which may correspondingly generate an increased level of vibration measurements. Some techniques for monitoring vibration measurements may flag such a sudden change in the vibration measurements in this situation as an anomaly or as potentially problematic, but this sudden jump in the vibration measurements may not be indicative of an anomalous or excessive amount of vibrations, and thus reporting this jump may result in a false positive.

Accordingly, the inability to control such factors may render analyses infeasible or inaccurate. In particular, the inability to adequately process vibration data to control for variations may add significant complexity to performing industrial scale assessments of machines in a facility (e.g., because comparisons between given data points may be rendered useless by uncontrolled disparities between the given data points). Thus, techniques are described herein by which operational data (e.g., vibration measurements obtained from sensors on industrial machinery or other equipment) may be used to detect potential issues for industrial equipment before a failure or other potentially substantial negative results occur due to the issues (e.g., before excessive degradation of the equipment, which may in turn cause a catastrophic failure, a temporary shutdown, or lead to the equipment needing to be prematurely replaced).

According to the techniques described herein, a system and device for analyzing machine performance (e.g., for analyzing vibrational performance) may obtain operational data (e.g., vibration data), such as from one or more sensors located on or near one or more machines. From the operational data, the system (or device) may perform a procedure to analyze the operational data to detect whether the operational data contains an anomaly, that is, a subset of the operational data indicating that there is a possibility for an issue with the machine from which the data was obtained. In some examples, the system and device may preprocess the obtained operational data according to the information in the data, model the operational data to identify an anomaly and associate the anomaly with a corresponding sensor and/or machine that may be experiencing an issue, and post-process the operational data to report this information to an operator of the system. According to the report, the operator may confirm whether or not the sensor or machine is experiencing an issue to be resolved and take appropriate action as needed to prevent a shutdown, damage, or other similarly undesirable result. In some examples, these or other anomaly detection procedures may be performed periodically as a batch process, for example, every night or according to any other like schedule.

In some examples, the procedures described herein leverage the power of particular anomaly detection algorithms to identify an anomaly and associate the anomaly with corresponding equipment that may experience a potential issue. For example, a device (or, e.g., several devices distributed in a processing system) may filter a dataset of operational data to obtain one or more groups (e.g., sets) of data including measurements (e.g., vibration measurements) obtained via particular numbers of the most recently performed measurement readings. For example, the device may filter the dataset to obtain a first group of vibration data including the most recent 3,000 data points (i.e., the 3,000 most recent measurements) and a second group of vibration data including the most recent 1,000 data points (e.g., the filtering performed in both an x-axis and a y-axis, such as by time and by a vibration measure, respectively). In this way, the first group of vibration data may correspond to a long-term window and the second group of vibration data may correspond to a short-term window, which may be used alone or in combination to classify faults (e.g., potential anomalies) as either "long-term" or "short-term." In other examples, it is contemplated that the groups of vibration data may be filtered to include any number of data points either greater than or less than the 3,000 and 1,000 data point groups described herein.

In some examples, after filtering the dataset to obtain the different groups of vibration data (e.g., each corresponding to different length windows), the device may use an anomaly detection algorithm, such as a univariate anomaly detection algorithm (e.g., an isolation forest algorithm), to detect outliers in each of the sets of data points in each respective group of vibration data. The device may then compare an amplitude of each of the outliers to a threshold for the respective group of vibration data, such as via a high-pass filter, to determine a subset of the outliers with the more excessive overall vibration readings (e.g., the data points with the greatest measurements or their measurements having the greatest deviations, etc.). In some examples, the device may determine that a cluster or certain quantity of outliers indicates (or at least potentially indicates) an anomaly associated with the sensor(s) or device(s) from which the corresponding vibration data was obtained.

In some examples, the device may generate a report including an indication of this anomaly (e.g., either directly by reporting the particular outliers or indirectly via a composite indication) and communicate this report with an operator or engineer for the associated facility. In some examples, the report may also indicate whether any information indicated in the report is associated with the long-term and/or the short-term windows. Based on the report, the operator or engineer may confirm whether the device(s) associated with any indicated anomalies are indeed operating abnormally and, if needed, troubleshoot these device(s) or otherwise mitigate potential negative effects of the anomaly.

Accordingly, the techniques described herein provide early detection of potential mechanical and/or operational issues associated with operating machinery and other industrial equipment. Thus, an operator or engineer responsible for maintaining the machinery may more quickly and more accurately identify these issues, thereby mitigating and/or preventing damage and other negative effects related to these issues. Additionally, the techniques described herein may be agnostic to the particular underlying asset and agnostic to the particular indicator or type of data that is used. That is, the techniques described herein for analyzing machine performance may be implemented similarly with respect to any type of device in any applicable environment as well as with respect to any other data or measurement type (e.g., temperature, or any other like characteristic).

FIG. 1 shows an example of an industrial facility 100 including a device 105 that supports analyzing machine performance in accordance with aspects of the present disclosure. The facility 100 may include a performance monitoring system (e.g., a vibration monitoring system), where the performance monitoring system may include the device 105 and one or more machines 110, where the device 105 may be a server or other computing device (or, alternatively, multiple distributed devices serving a similar function) configured to analyze performance of the machines 110 (e.g., vibrational performance of the machines 110). The device 105 may obtain operational data (e.g., vibration data) from one or more sensors 115 located on one or more respective machines 110 (e.g., coupled with or integrated with the machines 110) or near one or more respective machines 110 (e.g., while being in communication with the respective machines 110).

In some examples, the device 105, such as a server or other computing device, may be in electronic communications with one or more of the sensors 115, where the sensors 115 are configured to collect measurements associated with one or more of the machines 110 in the facility 100 (e.g., mill equipment or other machinery in an industrial facility). The device 105 may communicate with the sensors 115 via a wireless connection, such as communications using one or more radio access technologies including fourth generation (4G) systems such as Long-Term Evolution (LTE) systems, fifth generation (5G) systems which may be referred to as New Radio (NR) systems, or Wi-Fi systems (e.g., wireless local area network (WLAN) systems). Additionally or alternatively, the device 105 may communicate with the sensors 115 via a wired connection.

In some examples, an operator (or, e.g., an engineer or other personnel of the facility 100) may be stationed within or near the facility 100, and the operator may communicate with the device 105 via a user equipment (UE) 120 (e.g., a cellular telephone, a laptop, or any other communications device). As shown by the dashed line in FIG. 1 between the indoor and outdoor UEs 120, in some examples, the operator with the UE 120 may be located in (or within a proximity to) the facility 100. Alternatively, the operator with the UE 120 may not be located near the facility 100, such as for remote personnel (e.g., a remote engineer). In this case, the remote personnel may be trained and equipped to communicate instructions to personnel that are physically located at the facility 100 and/or to transmit signals to machinery and other assets of the facility 100 from the remote location (e.g., from a corporate office).

In some examples, the device 105 may communicate information with the UE 120 to inform the operator of the UE 120 as to a status or updates for the machines 110, for example, according to measurements for the machines 110 received from the sensors 115. Based on the information received from the device 105, the operator of the UE 120 may perform maintenance, adjustments, and the like on one or more of the machines 110 and/or one or more of the sensors 115.

FIG. 2 shows an example dataset 200 that supports analyzing machine performance in accordance with aspects of the present disclosure. As similarly described herein, in a vibration monitoring system, a device (e.g., a server) may collect measurements, such as vibration data, in various formats and at different intervals, from one or more sensors (e.g., sensors 115). Before analyzing the data, the device may preprocess the data to format the data in a way that it is organized and usable for interpretation, manipulation, and the like.

To preprocess vibration data, for example, the device may convert the data into a long format, such as is shown by the example dataset 200 of FIG. 2. The example dataset 200 includes several columns for corresponding information, for example, a column for an indicator type, a date-time, and a column for measurements for each sensor.

Further to preprocess the vibration data, the device may aggregate the data in the converted dataset 200 according to a time interval. In this way, the device may group vibration data into one or more groups of vibration data, where each group of vibration data corresponds to a respective time interval. For example, as shown by the example dataset 200 of FIG. 2, vibration data may be grouped (e.g., aggregated) by hour, that is, according to respective time intervals of each one-hour interval (although any other duration time interval may be used similarly are thus also contemplated herein). By grouping the data according to a fixed time interval, the data may be normalized irrespective of the collection frequency of any particular sensor relative to another sensor. That is, by normalizing the data according to particular fixed time intervals, data collected from a sensor that relatively less frequently collects data may be grouped with only the data in one fixed time interval from another sensor that might collect data with a substantially higher frequency. Thus, normalizing the data by time helps to prevent the data from disproportionately valuing the data from sensors and machines that might simply report data more frequently than other sensors and machines.

Figure 3:
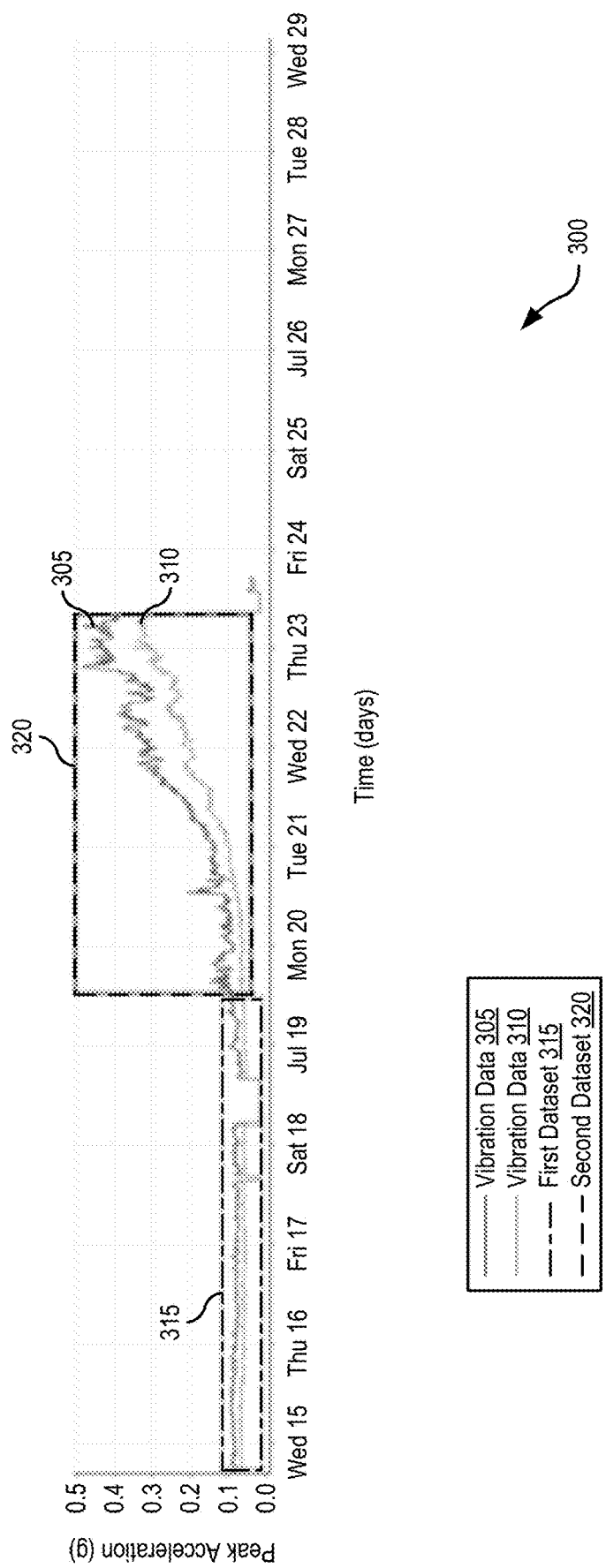
FIG. 3 shows a graph for an example dataset that supports analyzing machine performance, in accordance with aspects of the present disclosure.

FIG. 3 shows a graph 300 for an example dataset that supports analyzing machine performance in accordance with aspects of the present disclosure. The example dataset shown in the graph 300 includes a first group of vibration data 305 and a second group of vibration data 310. The graph 300 shows vibration data plotted according to measurements for a peak acceleration (in units of standard gravity (g)) over time (in units of days). The example dataset shown in FIG. 3 includes a first dataset 315 and a second dataset 320 following the first dataset 315 in the time domain. The example dataset of FIG. 3 shows an example in which trend data (e.g., including the first group of vibration data 305 and/or the second group of vibration data 310) increases over time, as shown by the relatively normal vibration data in the first dataset 315 followed by an increasing vibration trend for the vibration data in the second dataset 320.

After preprocessing the vibration data, the device may model the vibration data to identify an anomaly (or multiple anomalies), that is, according to a model for identifying anomalies in groups of vibration data. The device may accordingly associate the anomaly with a corresponding sensor and/or machine that may be experiencing an issue based on the model. In some examples, the model uses a univariate approach when determining whether to associate (or not to associate) an anomaly with each unique combination of sensors and indicator types. That is, by using a univariate equation dependent only on the particular combination of sensor and indicator type, discrepancies and thus mechanical issues and the like are relatively more easily identifiable.

Additionally or alternatively, the model may use an artificial intelligence (AI) learning algorithm to identify anomalies, where the learning algorithm may use an unsupervised learning approach to identifying potential issues (e.g., as opposed to a supervised learning approach). In a supervised learning approach, the device attempts to predict when an asset will fail by analyzing when a similar or analogous asset has failed in the past. A supervised learning approach, however, may require a relatively large amount of time for training and, in cases in which a sufficient amount of time has not yet been spent training the algorithm, predictions may be less reliable (e.g., when there is not sufficient failure data based on which to learn and make predictions). Thus, rather than predict when an asset is going to fail, the model may use an unsupervised learning approach in which the algorithm may learn and detect vibration signatures that are indicative of potential failures. In some examples, the unsupervised learning algorithm used by the model may similarly account for substantially any type of measurement, indicator type, and/or asset. As such, the model's learning algorithm may, in some cases, periodically retrain (e.g., on a nightly basis, or according to any other like schedule). Thus, the model is not limited to a particular indicator type and may be quickly retrained to provide accurate predictions for any number of different implementations.

In some cases, when using predictive maintenance, vibration data that indicates an increasing vibration trend may be a sign that there is an issue with the underlying asset (e.g., an anomaly). That is, when vibration trend data increases, the vibration data tends to include data points that are outside of the normal operating behavior. Accordingly, the techniques described herein detect, and over time learn to better detect, these increases in trend data. By using anomaly detection, the device may determine when the vibration trend data extends (or is likely to extend) beyond a normal level of vibration activity.

FIG. 3 depicts the first dataset 315 and a second dataset 320 following the first dataset 315 in the time domain. The example dataset shown by the graph 300 of FIG. 3 shows that the first dataset 315 includes relatively normal vibration patterns, that is, where the device may not determine (or may be relatively less likely to determine) that the vibration data 305 and/or the vibration data 310 includes an anomaly.

The second dataset 320, however, includes vibration patterns (e.g., a vibration signature) with an increasing vibration trend, which may be (or be similar enough to) a vibration pattern that the device has learned to detect (e.g., via an unsupervised learning algorithm). That is, based on the increasing vibration trend of the vibration data 305 and the vibration data 310 in the second dataset 320, the device may determine (or may be relatively more likely to determine) that the vibration data 305 and/or the vibration data 310 includes an anomaly.

In some examples, the device may additionally be configured with parameters for performing debugging operations (e.g., debugging parameters) and/or for performing performance optimizations (e.g., performance parameters). In some cases, the device may be configured with the debugging parameters and/or the performance parameters before using the model to identify an anomaly in the vibration data and to associate the anomaly with a corresponding sensor and/or machine that may be experiencing an issue. In some cases, the device be configured with a condition that the debugging parameters and/or the performance parameters be configured before using the model, or, alternatively, the device be configured with one or more default values for the debugging parameters and/or the performance parameters (or, e.g., may be configured to bypass the debugging operations and/or the performance optimizations).

In some examples, the device may perform debugging operations according to one or more debugging parameters to troubleshoot the vibration monitoring system described herein. The debugging parameters may include one or more of: a debug parameter (e.g., "debug"—a parameter that may be toggled between "True" and "False," and when set to "True" indicates that verbose debugging messages are to be printed on a console for debugging by a user); a plotting parameter (e.g., "plot_all_charts"—a parameter that may be toggled between "True" and "False," and when set to "True" informs the algorithm to create charts of the trend overlayed with highlights of the anomalies), and/or a data description (e.g., "data_description"—a suffix that may be used to identify different debugging plots, such as to differentiate data from different facilities). In some examples, the debugging operations and debugging parameters may not affect how the model performs, but rather may be used only for debugging operations to identify and/or troubleshoot issues with the vibration monitoring system itself.

In some examples, the device may perform performance optimizations according to one or more performance parameters to optimize one or more parameters for using the model to identify an anomaly in the vibration data and to associate the anomaly with a corresponding sensor and/or machine as described herein. The performance parameters may include one or more of: data (e.g., data that has been received from one or more sensors, has been preprocessed, and is to be modeled); a date-time column indicator (e.g., "datetime_column"—identifying a name for a column that includes date-time information); an indicator column type (e.g., "indicator_type_column"—identifying a name for a column that includes indicator type information); a window size parameter (e.g., "window_size"—identifying sizes for short-term and/or long-term window sizes, to be used by the algorithm described herein; and may have one or more default values configured, such as 1,000 and 3,000, respectively); a number of processors (e.g., "cpus"—an indication of a number of processors (cores) to use for the model as described herein, which may be optimized for multi-core processor technologies such as parallel processing, and where a greater value for the parameter may provide a higher processing speed and shorter time spent to perform the modelling procedures); and/or a sensitivity parameter (e.g., "sensitivity"—controlling how sensitive the model is to detecting anomalies in the trend data; and may have a default value configured, such as 0.01, and may be programmatically updated to increase or decrease a sensitivity to respectively identify more or less datasets as potentially including an anomaly).

Figure 4:
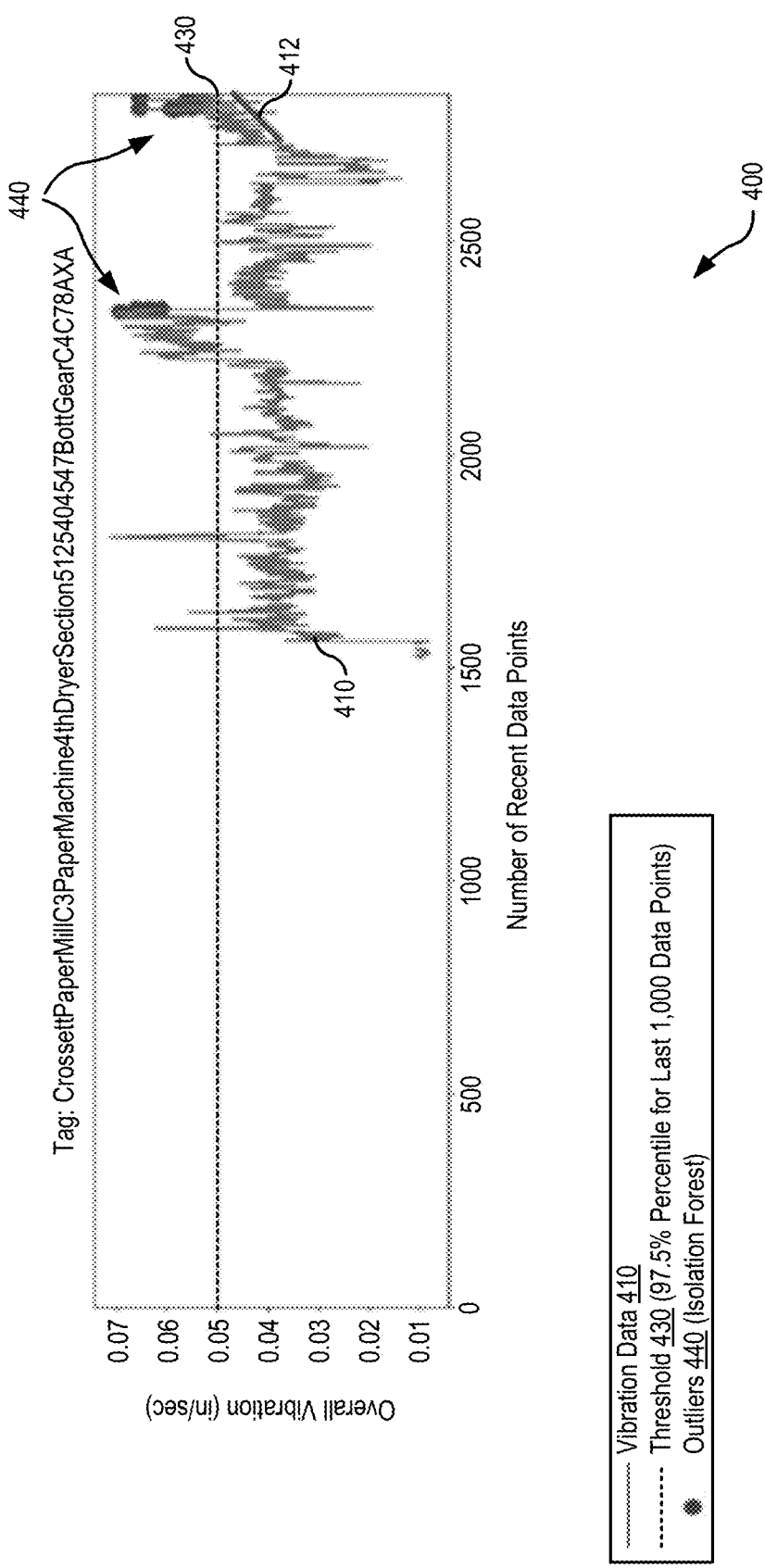
FIG. 4 shows a graph for an example dataset that supports analyzing machine performance, in accordance with aspects of the present disclosure.

FIG. 4 shows a graph 400 for an example dataset that supports analyzing machine performance in accordance with aspects of the present disclosure. The example dataset shown in the graph 400 includes one group of vibration data 410 (as identified according to the concatenated indicator type information in the key: "CrossettPaperMillC3PaperMachine4thDryerSection51254 04547BottGearC4C78AXA"). The graph 400 shows the vibration data 410 plotted according to measurements for an overall vibration (in units of inches per second (in/sec)) over a number of recent data points. The example dataset of FIG. 4 shows an example in which trend data (e.g., a trend of the vibration data 410) increases over time, as shown by a trendline 412 having a positive slope.

As shown by the graph 400 in FIG. 4, the vibration data 410 has generally trended higher over the time taken to obtain each of the data points shown (e.g., a small number of days). According to the techniques described herein, the model is shown to have detected that an anomaly is likely in the vibration data 410 based on the levels of the overall vibration measurements satisfying a corresponding vibration threshold 430 (i.e., that there may potentially be a problem occurring at a respectively associated machine when the overall vibration level reached relatively high levels that satisfy or exceed the corresponding vibration threshold 430).

The model, as described herein, may include a series of steps (e.g., each of, or a portion thereof, in combination) that may be performed at the device to identify anomalous trend data. While the data is described herein as vibration data 410 for identifying anomalies in vibration data, the model and other procedures described herein may be implemented similarly for other types of operational data.

In some examples, the model may include a step in which the device verifies the structure of the vibration data 410, for example, by confirming that the vibration data 410 has a column for an indictor type and for a datetime. If the device determines that the vibration data 410 does not include this column for an indictor type and for a datetime, the device may return to the preprocessing procedures as described herein.

In some examples, the model may include a step in which the device filters the vibration data 410 (e.g., filtering the vibration data 410 as may have been grouped together for each time interval, as described herein). The device may filter the vibration data 410 to obtain one or more groups of vibration data 410, for example, a first group of vibration data 410 that includes the most recent 1,000 data points and a second group of vibration data 410 that includes the most recent 3,000 data points. The particular numbers stated here (i.e., 1,000 and 3,000) for filtering the data point count of the vibration data 410 may approximately correspond to data gathered over windows of one month (e.g., a short-term window) and three months (e.g., a long-term window), respectively, for example, when using one-hour time intervals for grouping the vibration data 410. Other numbers of data points are contemplated herein and may be implemented similarly to correspond to longer or shorter time periods and/or to account for longer or shorter collection frequencies or grouping time intervals. As similarly described herein, one or more window size parameter may be configured to adjust the short-term and long-term windows.

In some examples, the model may include a step in which the device uses an anomaly detection algorithm, such as a univariate anomaly detection algorithm (e.g., an isolation forest algorithm), to detect outliers 440 in each of the sets of data points in each respective group of vibration data 410 (e.g., detecting outliers 440 in the subset of data points in the vibration data 410 for the short-term window as well as outliers 440 in the subset of data points in the vibration data 410 for the long-term window). The isolation forest algorithm is an anomaly detection algorithm that detects anomalies based on path lengths associated with data points in an "isolation tree" structure, rather than, for example, comparing data point to a model of "normal" points (the isolation forest algorithm may be found, e.g., in the scikit-learn library in the Python programming language). For example, with reference to the example dataset shown in the graph 400 of FIG. 4, a set of parameters for the isolation forest algorithm may include: an "n_estimators" parameter set to 150; a "max_samples" parameter set to 500; a "contamination" parameter set to 0.01 (as may be defined as equal to a value configured for a sensitivity parameter); a "max features" parameter set to 1; a "random state" parameter set to 864; and a "bootstrap" parameter toggled (e.g., between "True" and "False") to False. It is noted that these specific parameters and correspondingly configured values are only one example, and any other operable configuration may be implemented similarly. Likewise, although the use of the isolation forest algorithm is described herein, any other like algorithm for detecting anomalies may be implemented similarly.

In some examples, the model may include a step in which the device filters the outliers 440 obtained via the anomaly detection algorithm, for example, via a high-pass filter. Because the anomaly detection algorithm (e.g., such as the isolation forest algorithm) may return points that are outliers 440 on both of the higher and the lower sides of the normal operation band, the high-pass filter may be applied to the output from the anomaly detection algorithm to obtain a subset of the outliers 440 that have values on the higher side of the normal operation band and/or that have the greatest values among all of the outliers 440 returned by the anomaly detection algorithm.

Figure 5:
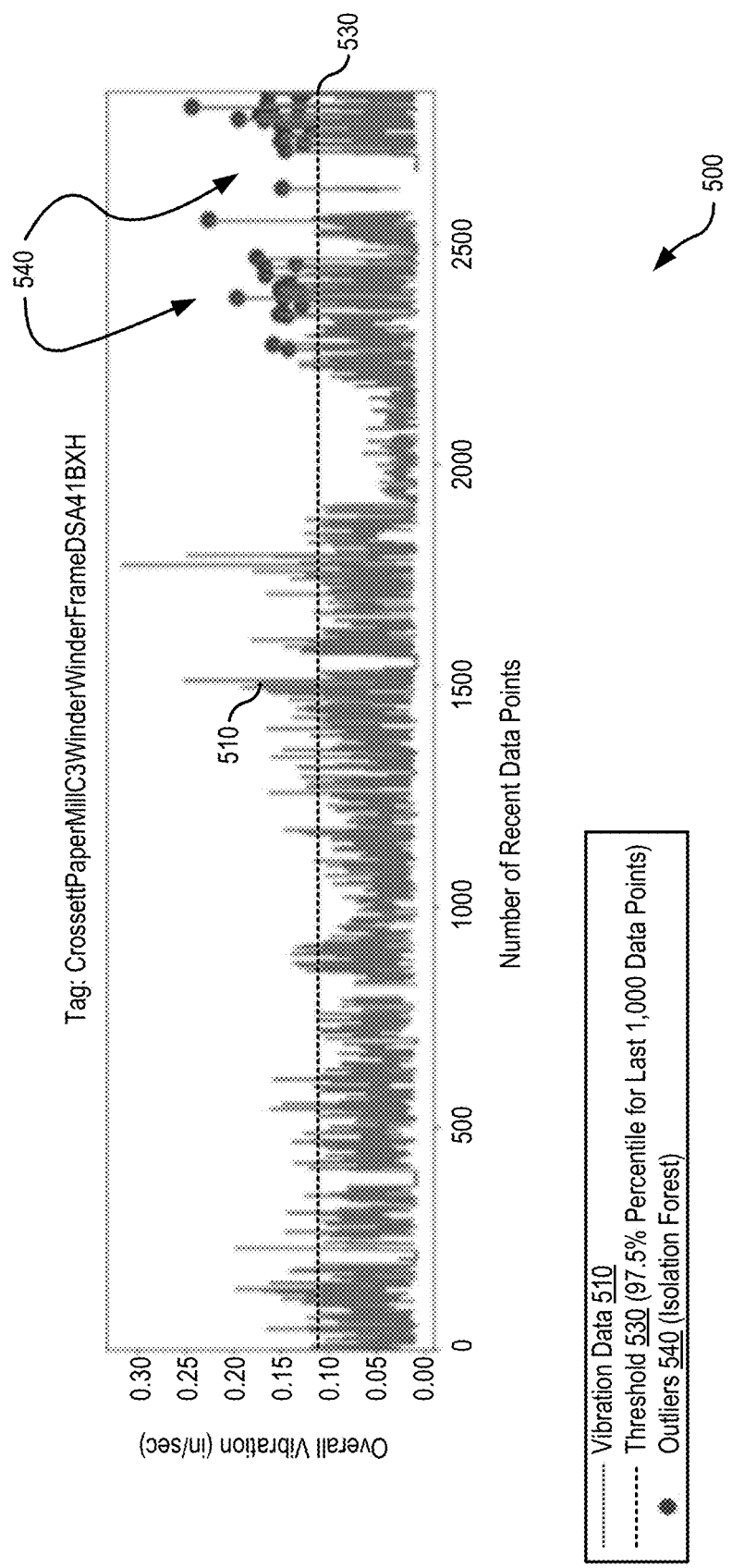
FIG. 5 shows a graph for an example dataset that supports analyzing machine performance, in accordance with aspects of the present disclosure.

FIG. 5 shows a graph 500 for an example dataset that supports analyzing machine performance in accordance with aspects of the present disclosure. The example dataset shown in the graph 500 includes one group of vibration data 510 (as identified according to the concatenated indicator type information in the key: "CrossettPaperMillC3WinderWinderFrameDSA41BXH"). The graph 500 shows the vibration data 510 plotted according to measurements for an overall vibration (in units of in/sec) over a number of recent data points. The example dataset of FIG. 5 shows an example in which trend data (e.g., a trend of the vibration data 510) neither substantially decreases nor substantially increases over time. According to the techniques described herein, the model is shown to have detected that an anomaly is likely in the vibration data 510 based on the levels of the overall vibration measurements satisfying a corresponding vibration threshold 530 (i.e., that there may potentially be a problem occurring at a respectively associated machine when the overall vibration level reached relatively high levels that satisfy or exceed the corresponding vibration threshold 530).

As shown by the graph 500 in FIG. 5, not all outliers or anomalous activity are necessarily preceded by a trend. Rather, outliers and anomalous activity may, in many cases, occur as extreme spikes in activity (e.g., as may be caused by unpredictable or non-standard forces on a corresponding machine, such as by an external force or interruption). The model, as described herein, may also detect these outliers and anomalies that are not preceded by a discernable trend.

For example, as shown in the graph 500 of FIG. 5, outliers 540 are shown for the most recent 1,000 data points (e.g., corresponding to approximately one month of measurements) for the overall vibration measurements. The outliers 540 shown in FIG. 5 are the result of applying an isolation forest algorithm to detect a set of outliers and then determining the highlighted outliers 540 to be potential anomalies by comparing each outlier of the set of outliers obtained from the isolation forest algorithm to a threshold 520, where the threshold 520 is set at a 97.5% percentile for the group including the most recent 1,000 data points. Thus, the remaining highlighted outliers 540 shown in FIG. 5 are determined according to the algorithm as the outliers 540 in a short-term window (of the most recent 1,000 data points) that have the greatest amplitudes of the entire set of outliers obtained via the isolation forest algorithm.

In some examples, the device may determine whether the outliers 540 of the vibration data 510 include an anomaly (e.g., associated with one or more sensors and one or more assets) based on a quantity of outliers 540 of the short-term window that are within a detection window (e.g., 24 hours), a quantity of outliers of a long-term window that are also within the detection window, and/or a relation between the quantities of outliers 540 within the detection window for the short-term and the long-term windows. That is, the device may count a number of outliers 540 that occurred for both the short-term window and the long-term window in the last 24 hours (i.e., in a 24-hour detection window).

The number of outliers 540 in the last 24 hours that occurred for both the short-term window and the long-term window may be used to identify "normal" behavior of an asset over different operating periods. In some examples, behavior that is considered normal in one period may be considered abnormal in another operating period (e.g., the same recent data points may be considered normal behavior in the short-term window while also being considered abnormal in the long-term window, or vice versa). Thus, the number of outliers identified over the last 24 hours (i.e., the detection period) may be different for each different window length.

Figure 6:
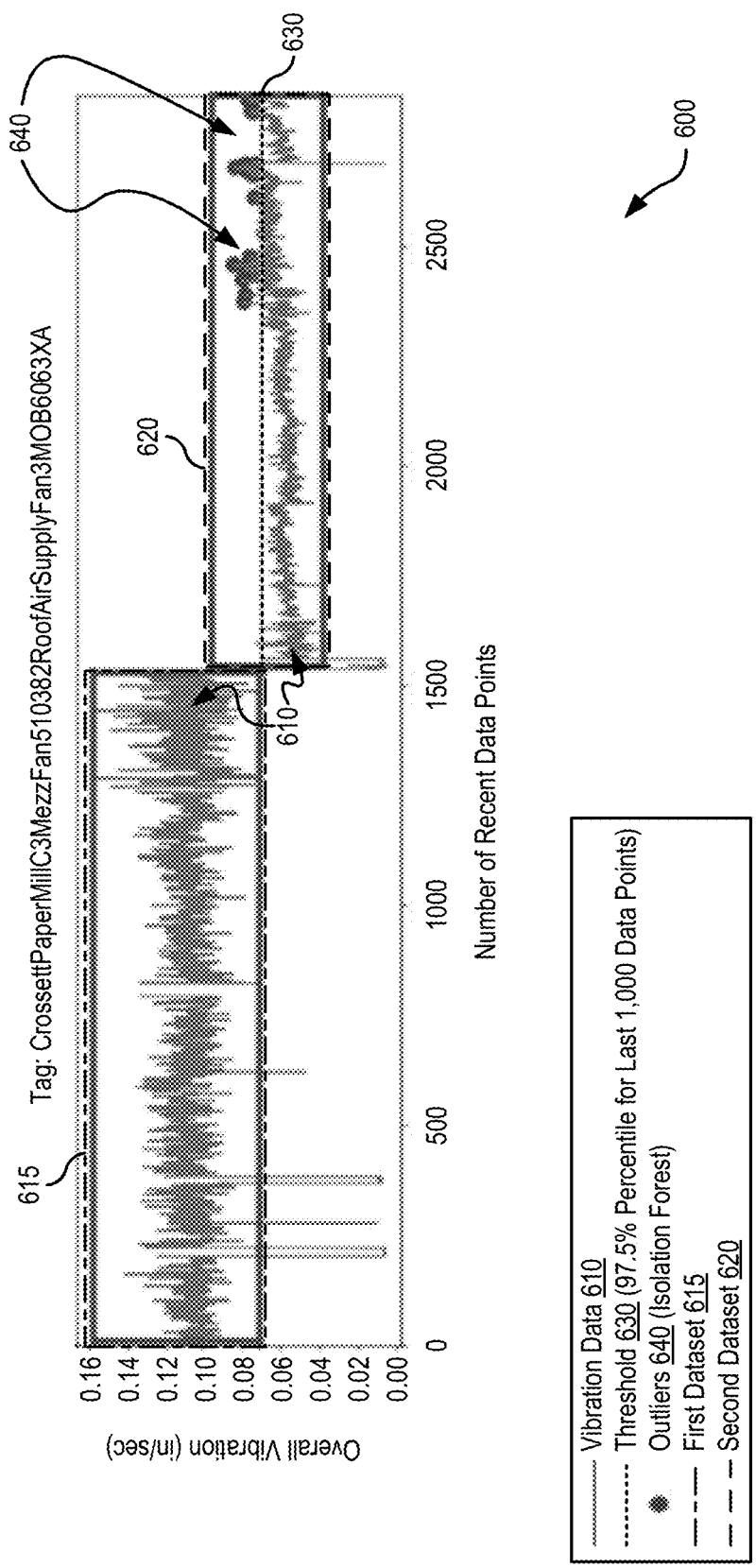
FIG. 6 shows a graph for an example dataset that supports analyzing machine performance, in accordance with aspects of the present disclosure.

FIG. 6 shows a graph 600 for an example dataset that supports analyzing machine performance in accordance with aspects of the present disclosure. The example dataset shown in the graph 600 includes one group of vibration data 610 (as identified according to the concatenated indicator type information in the key: "CrossettPaperMillC3MezzFan510382RoofAirSupplyFan3MOB6063XA"). The graph 600 shows the vibration data 610 plotted according to measurements for an overall vibration (in units of in/sec) over a number of recent data points. The example dataset shown in FIG. 6 includes a first dataset 615 and a second dataset 620 following the first dataset 615 in the time domain. The example dataset of FIG. 6 shows an example in which the use of multiple windows for the model described herein are needed to predict outliers 640 after, for example, an anticipated and persistent or permanent (or semi-permanent) change in the vibration data 610.

The example dataset of FIG. 6 shows an example in which the vibration data 610 of the first dataset 615 represents an "old normal" and the vibration data 610 of the second dataset 620 represents a "new normal"—that is, an intentional or predicted shift in the level of the vibration data 610 from the first dataset 615 to the second dataset 620.

The short-term window (including, e.g., the 1,000 most recent data points), the long-term window (including, e.g., the 3,000 most recent data points), and the detection window (e.g., a 24-hour window) are rolling windows that may account for changes from between different "normals," for example, as shown by the graph 500 of the vibration data 610 in FIG. 6. Thus, the model, as described herein, may use the different rolling windows to determine that the change in the vibration data 610 from the first dataset 615 to the second dataset 620 is not necessarily an anomaly.

According to the model, the device may use the vibration data 610 of the most recent data points to establish normalcy and identify the outliers 640 according to the "new normal" (e.g., the "new normal" as per the second dataset 620). If only the combination of the vibration data 610 in the first dataset 615 with the second dataset 620 were considered, the device would not correctly identify the outliers 640 shown in FIG. 6 (e.g., the device would determine a substantially higher threshold 630 due to counting the first dataset 615). Thus, whereas another system or device that only considers the combined, complete window across both of the first dataset 615 and the second dataset 620 may switch to an offline state for a duration of time to retrain a new set of hyperparameters (e.g., doing so each night to retrain), the device for analyzing machine performance as described herein can accurately set a threshold 630 based on the second dataset 620 and not on the first dataset 615. Accordingly, the device may accurately and quickly identify the outliers 640 (and thus correspondingly, the anomalies) in the trend data of the second dataset 620 without, for example, switching offline to retrain a new set of hyperparameters.

Accordingly, in some examples, the device records a number of outliers that occurred in the last 24 hours both for the short-term window and for the long-term window. In some examples, the device may store this information, with other information such as metadata including one or more of a facility name, a sensor name, a reporting date, a facility identifier (e.g., a facility id), and/or an indicator (as well as any or all of the other information described herein) in a storage medium (e.g., memory 1530). In some examples, this storage location may be or include non-transitory computer-readable media at the device or that the device may access, such as random-access memory (RAM), read-only memory (ROM), electrically erasable programmable ROM (EEPROM), flash memory, a compact disk (CD) ROM or other optical disk storage, a magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, the device may store the information at a remote device or via a remote service, such as via a cloud storage system, a cloud storage service, and/or at a data warehouse that the device may access using wireless communications, for example.

FIG. 7 shows an example report 700 for an example dataset that supports analyzing machine performance, in accordance with aspects of the present disclosure. As similarly described herein, in a vibration monitoring system, a device may post-process the vibration data that has been modeled to identify an anomaly and associate the anomaly with a corresponding sensor and/or machine that may be experiencing an issue. The device may post-process the modeled vibration data to produce and share a report of the modeled data.

In some examples, post-processing may be the last step in detecting anomalous trend data. During post-processing, the device may generate a report, such as is shown by the example report 700 of FIG. 7. The report 700 may include several columns for corresponding information. For example, as similarly shown by the example report 700 of FIG. 7, the report 700 may include columns for one or more of: a facility name (e.g., "facility"); a sensor name (e.g., "tag_name"); a number of short-term outliers (e.g., "short_term_num_outliers"); a number of long-term outliers (e.g., "long_term_num_outliers"); a report date (e.g., "report_date"); a facility identifier (e.g., "facility_id"); and/or an indicator type (e.g., "indicator").

In some examples, to account for noise and randomness, a sensor may be configured not to report information if a number of outliers does not satisfy a reporting threshold and to report the information if the reporting threshold for the number of outliers is met. For example, the reporting threshold may be satisfied with at least four short-term outliers and/or at least four long-term outliers to report. Accordingly, in this example, a sensor that has three or fewer short-term and/or three or fewer long-term outliers to report may not report these outliers. In some cases, the reporting threshold may be configured at such a level that failing to satisfy the reporting threshold is indicative of only relatively minor issues (or no issues at all). Thus, in some examples, the sensor having fewer outliers to report than the reporting threshold may be regarded as relatively lower priority, because it may be substantially unlikely for a significant problem to occur in this situation.

In contrast, sensors having a relatively greater number of short-term outliers and/or long-term outliers tend to have more severe issues, and therefore these sensors may be assigned a higher priority. For example, in the illustrative example shown by the report 700 of FIG. 7, the report shows that the sensor named "sensor8" has indicated a higher outlier count for the short-term outliers (having 17 compared to each of the other sensors having between zero and nine) as well as a higher outlier count for the long-term outliers (having 11 compared to each of the other sensors having between three to five). Thus, as a result, the "sensor8" sensor may, in some examples, be the first (or one of the first) sensors to be investigated based on the information indicated in the report 700.

As similarly described herein, the report 700 is generated for the vibration monitoring system to transmit information to one or more additional personnel, such as to a remote engineer, an administrator, and/or other like personnel to report the results of the model. This transmitted information may be used to rectify problematic situations, perform maintenance, turn off critical machinery, and/or other like operations that may be performed to prevent, avoid, or mitigate the potential negative effects of an anomaly or other problem. For example, the device may transmit the report 700 to a remote engineer (e.g., via a wireless communications network), the remote engineer may receive the report 700 from the device, and the remote engineer may analyze the information indicated in the report 700 to determine whether actions should be taken based on the report. In some examples, the remote engineer may analyze the report 700 and create a short list of assets to which to give attention, where the short list may exclude one or more assets for which the information in the report 700 indicates are in relatively little need of maintenance (or are relatively unlikely to soon need maintenance).

In some examples, the remote engineer (or other personnel) may analyze the information indicated via the report 700 and determine a ranking or a priority list for each of the different assets included in the report 700 (e.g., ranking different machinery according to a number of short-term outliers, a number of long-term outliers, or both, to create a priority for addressing each of the machinery). In this example, if the remote engineer determines from the report 700 that an action should be taken to prevent, avoid, and/or mitigate a negative unplanned event at a high priority asset (as similarly described herein), the remote engineer may, for example, transmit an instruction to one or more devices at the correspondence facility and/or to additional personnel present at or near the facility. In such a scenario, an instruction may be to power off certain machinery, modify a performance of certain machinery, activate certain machinery, and/or any other operations that may be performed at an industrial facility to affect the performance of the machinery at the facility.

In some examples, the number of short-term outliers and the number of long-term outliers, as indicated in the report 700, may substantially agree, that is, the report 700 may indicate roughly similar numbers for these two metrics. In such cases, a relatively low indicated number for both of the short-term and the long-term outliers may indicate that the corresponding asset is at a relatively low risk of a negative issue occurring that would require assistance (e.g., from a remote engineer). Likewise, a relatively high indicated number for both of the short-term and the long-term outliers may indicate that the corresponding asset is at a relatively high risk of a negative issue occurring, and thus this asset should likely be prioritized for review (e.g., by a remote engineer). Alternatively, in some examples, the number of short-term outliers and the number of long-term outliers as indicated in the report 700 may meaningfully differ, that is, the report 700 may indicate substantially different numbers for these two metrics.

In such cases, this information may be directed to personnel such as a remote engineer to determine whether or not an anomaly is likely to have occurred. For example, the report 700 may indicate that the number of short-term outliers is relatively high while the number of long-term outliers is relatively low. In this example, a remote engineer may review the information in the report 700 and determine whether this discrepancy indicates that an anomaly is likely (e.g., in the case of a rapid increase in a number of short-term outliers due to a malfunction, outside interference, etc.) or that an anomaly is not likely (e.g., in the case of a known or pre-planned change to a "new normal" for the asset). Accordingly, engineers (and other trained personnel) can utilize the techniques described herein to relatively more accurately and quickly identify occurrences of anomalies at industrial assets so that actions may be taken to prevent, mitigate, and/or avoid a negative event and/or its associated costs.

Figure 10:
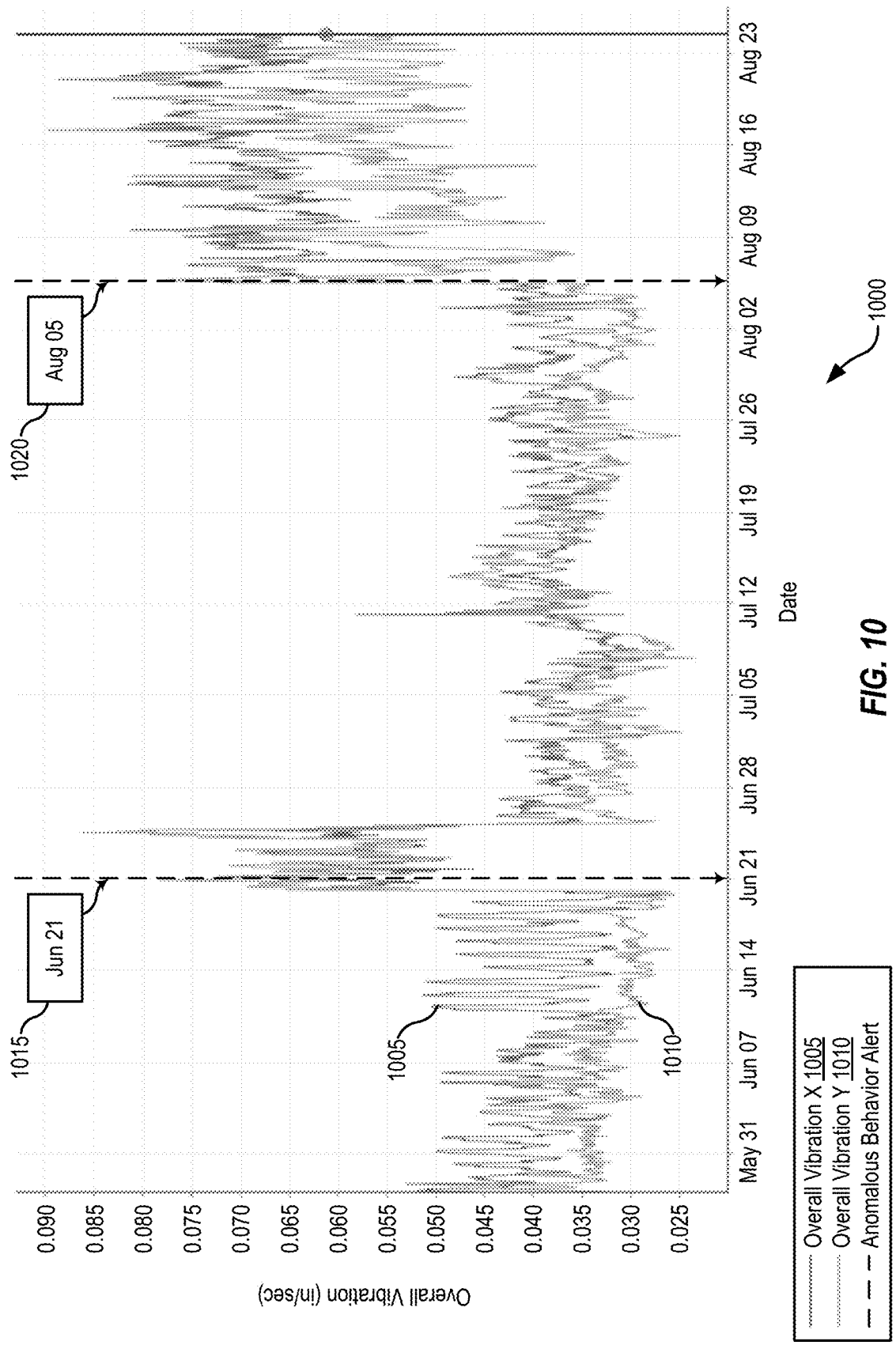
FIG. 10 shows a graph for an example dataset that supports analyzing machine performance, in accordance with aspects of the present disclosure.
Figure 11:
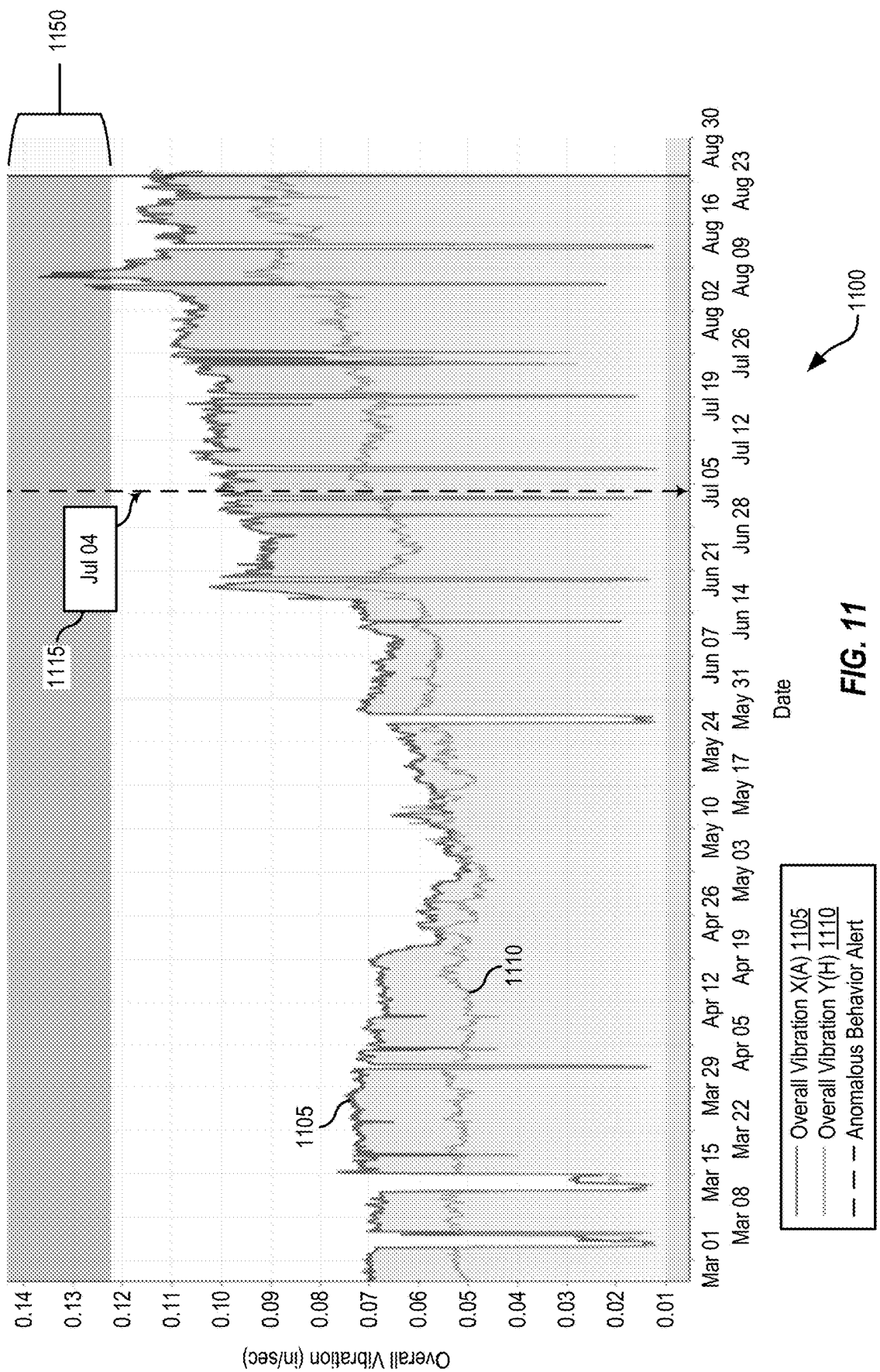
FIG. 11 shows a graph for an example dataset that supports analyzing machine performance, in accordance with aspects of the present disclosure.
Figure 12:
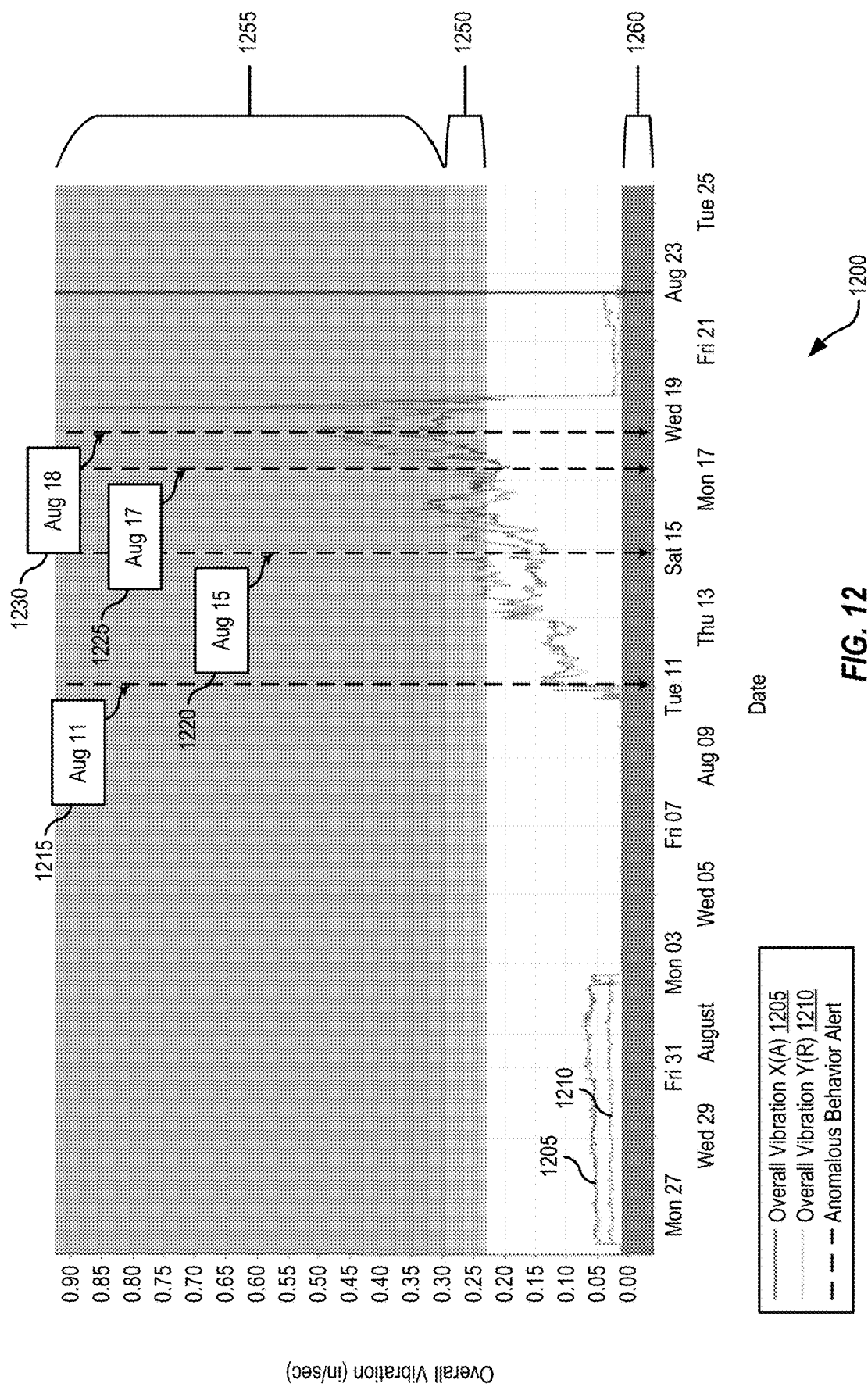
FIG. 12 shows a graph for an example dataset that supports analyzing machine performance, in accordance with aspects of the present disclosure.
Figure 13:
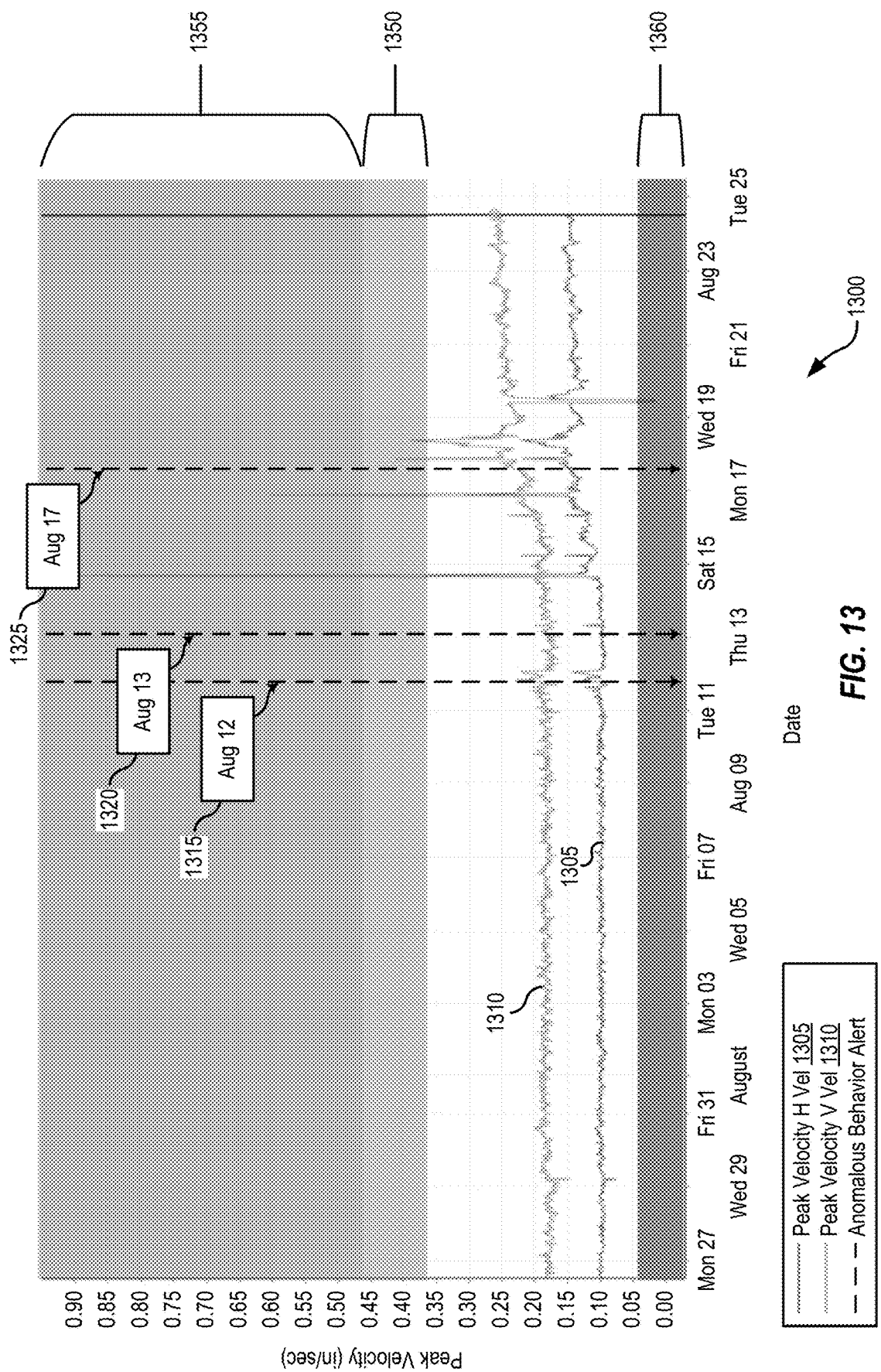
FIG. 13 shows a graph for an example dataset that supports analyzing machine performance in accordance with aspects of the present disclosure.
Figure 14:
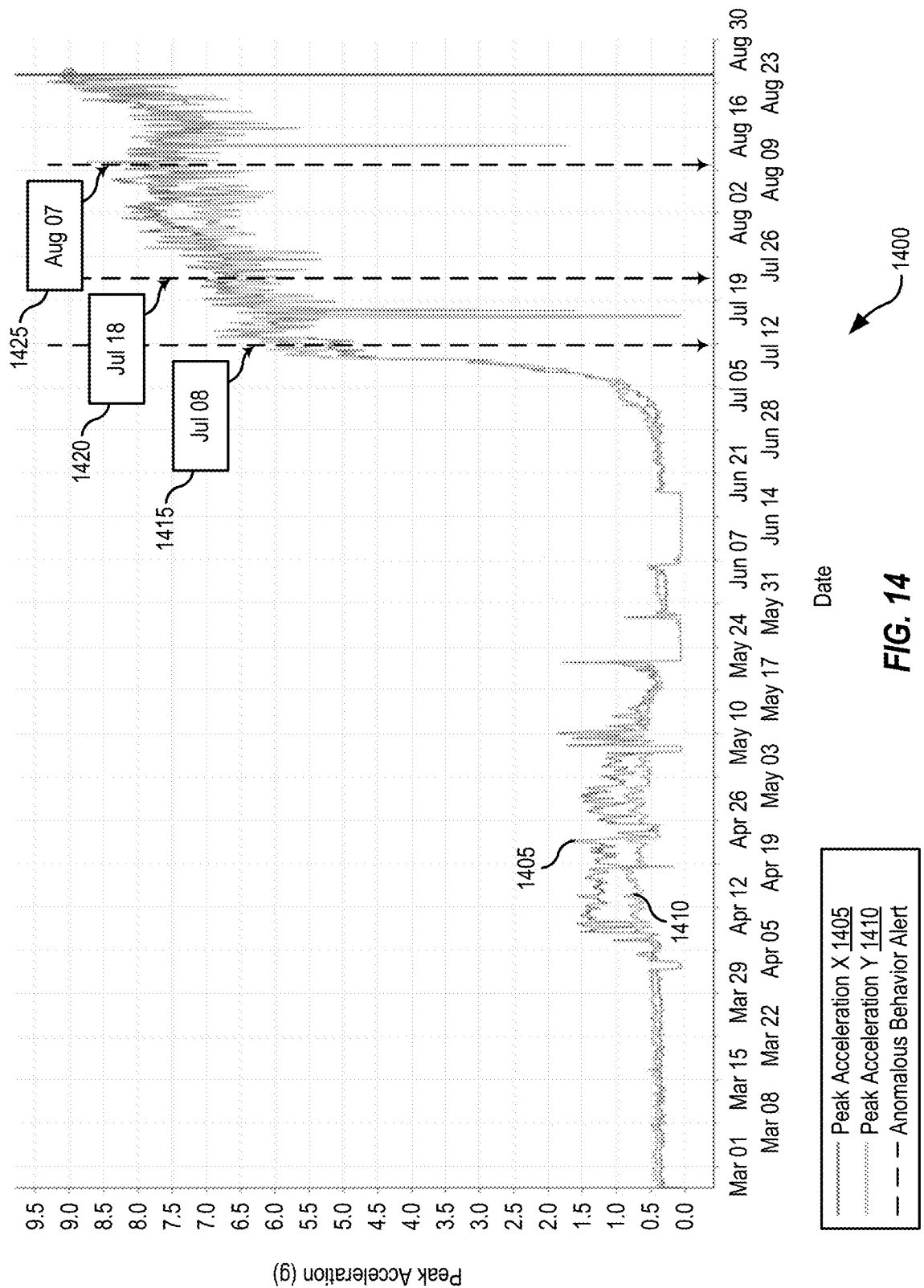
FIG. 14 shows a graph for an example dataset that supports analyzing machine performance in accordance with aspects of the present disclosure.

As described below, each of FIGS. 8 through 14 provides an example in which a machine learning anomaly detection model (e.g., operating according to the techniques described herein) may determine an occurrence of an anomaly at an industrial asset (in some cases, referred to as a "catch"). Accordingly, in these examples, a warning indication may be provided to an operator of the industrial asset based on determining the occurrence of the respective anomalies. FIGS. 8 through 11 provide examples of "long-term catches" that each indicate an anomaly associated with a long-term window. FIGS. 12 through 14 provide examples of "short-term catches" that each indicate an anomaly associated with a short-term window.

Figure 8:
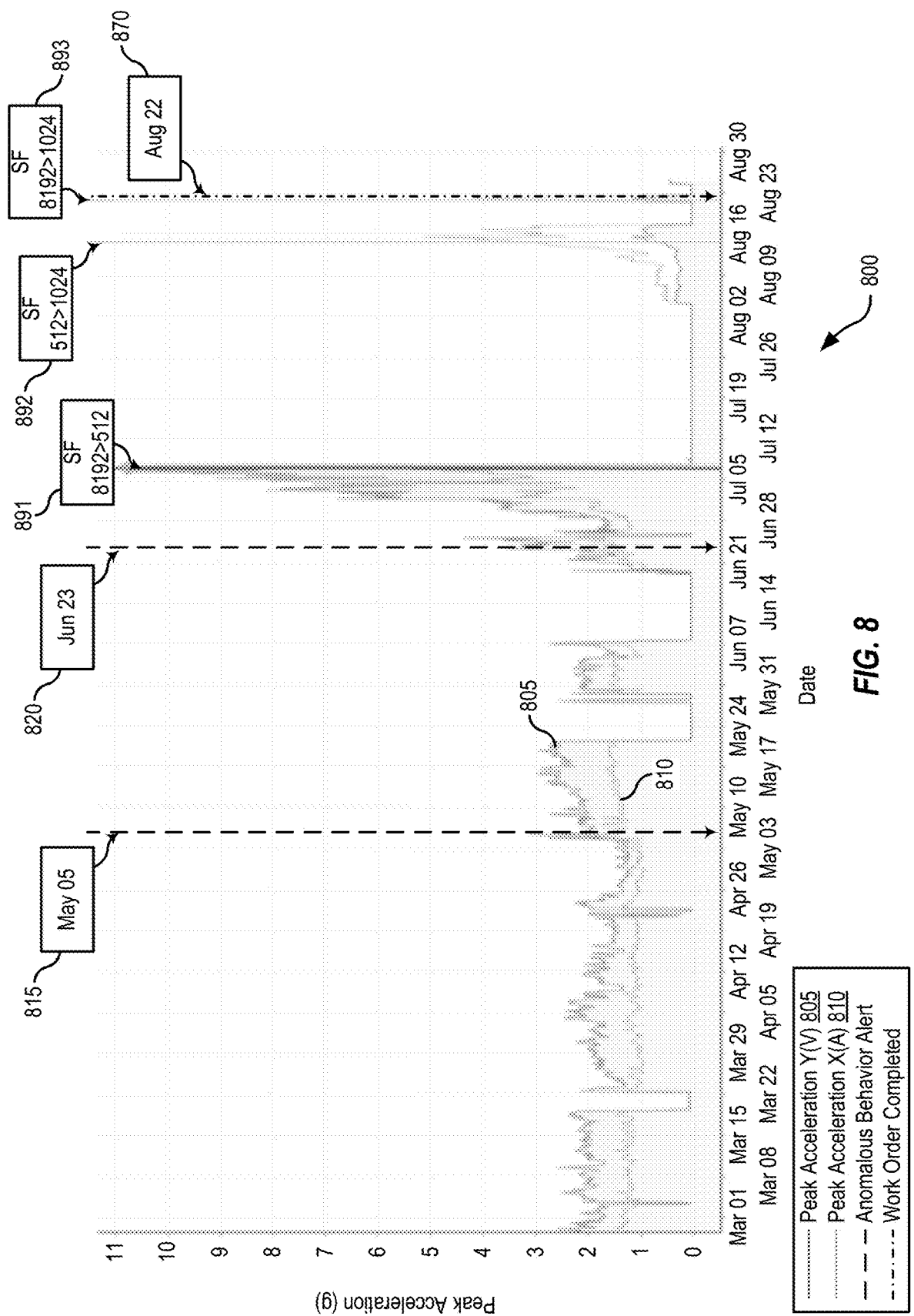
FIG. 8 shows a graph for an example dataset that supports analyzing machine performance, in accordance with aspects of the present disclosure.

FIG. 8 shows a graph 800 for an example dataset that supports analyzing machine performance, in accordance with aspects of the present disclosure. The example dataset shown in the graph 800 includes a first group of vibration data 805 (indicated to be based on a y-axis measurement of velocity) and a second group of vibration data 810 (indicated to be based on an x-axis measurement of acceleration). The graph 800 shows vibration data plotted according to measurements for a peak acceleration (in units of standard gravity (g)) over time (in units given by dates ranging from March 1 to August 30). FIG. 8 provides an example of a "long-term catch" indicating that an anomaly associated with a long-term window was identified.

At 815, the graph 800 shows that a first anomaly was detected on May 5. In this example, the first anomaly at 815 was detected using the techniques described herein for analyzing vibrational performance. For example, the first anomaly may have been detected based on one or more outliers detected in the dataset in the first group of vibration data 805 and/or the second group of vibration data 810, for example, based on a number of these detected outliers in a long-term window preceding the detection of the first anomaly on May 5 (e.g., within 3,000 data points, which may correspond to approximately three months).

At 820, the graph 800 shows that a second anomaly was detected on June 23. In this example, the second anomaly at 820 was detected using the techniques described herein for analyzing vibrational performance. For example, the second anomaly may have been detected based on one or more outliers detected in the dataset in the first group of vibration data 805 and/or the second group of vibration data 810, for example, based on a number of these detected outliers in a long-term window preceding the detection of the second detected anomaly on June 23 (e.g., within 3,000 data points, which may correspond to approximately three months).

The graph 800 also shows at 891, 892, and 893, three occurrences of events indicated by "SF." The three occurrences of events may indicate that, for a short timeframe, there was a peak acceleration or that the three highest peak-acceleration values occurred at the events indicated by "SF."

The graph 800 of FIG. 8 also shows that, at 870, a work order was completed on August 22 relating to the first anomaly reported on May 5. In some examples, a "days to failure" parameter, or other like information, may not be provided and/or known at the time that an anomaly is determined and transmitted to personnel (e.g., a remote engineer), for example as shown in FIG. 8, on May 5 for the first anomaly and on June 23 for the second anomaly. The work order completed at 870 on May 5 corresponds to the first anomaly reported on May 5. Thus, this work order was completed 109 days after the anomaly was first reported. In some examples, the priority of a particular work order may be based on a relative priority of the anomaly with which the work order is associated.

While each anomaly that is determined and reported will typically receive a corresponding work order, the completion of the work order at 870 is the only example in FIGS. 8 through 14 showing the completion of the work stemming from such a work order. Although not shown with respect to the second anomaly reported at 820 on June 23, or with respect to the remaining reported anomalies shown and described with reference to FIGS. 9 through 14, each reported anomaly is likely to have a corresponding work order. Each work order for each of the reported anomalies may be resolved in an amount of time that may be similar to the 109 days shown here with reference to FIG. 8, or may be completed in a smaller or greater number of days (e.g., based on demand, cost, complexity of the work order, among other like factors).

Additionally, the graph 800 of FIG. 8 does not show that these or any other anomalies were detected using techniques other than the techniques for analyzing vibrational performance as described herein. This may, although need not, indicate that the techniques described herein were able to determine the occurrence of the first anomaly at 815 and the second anomaly at 820 when other previously existing techniques may not have been able to do so.

Figure 9:
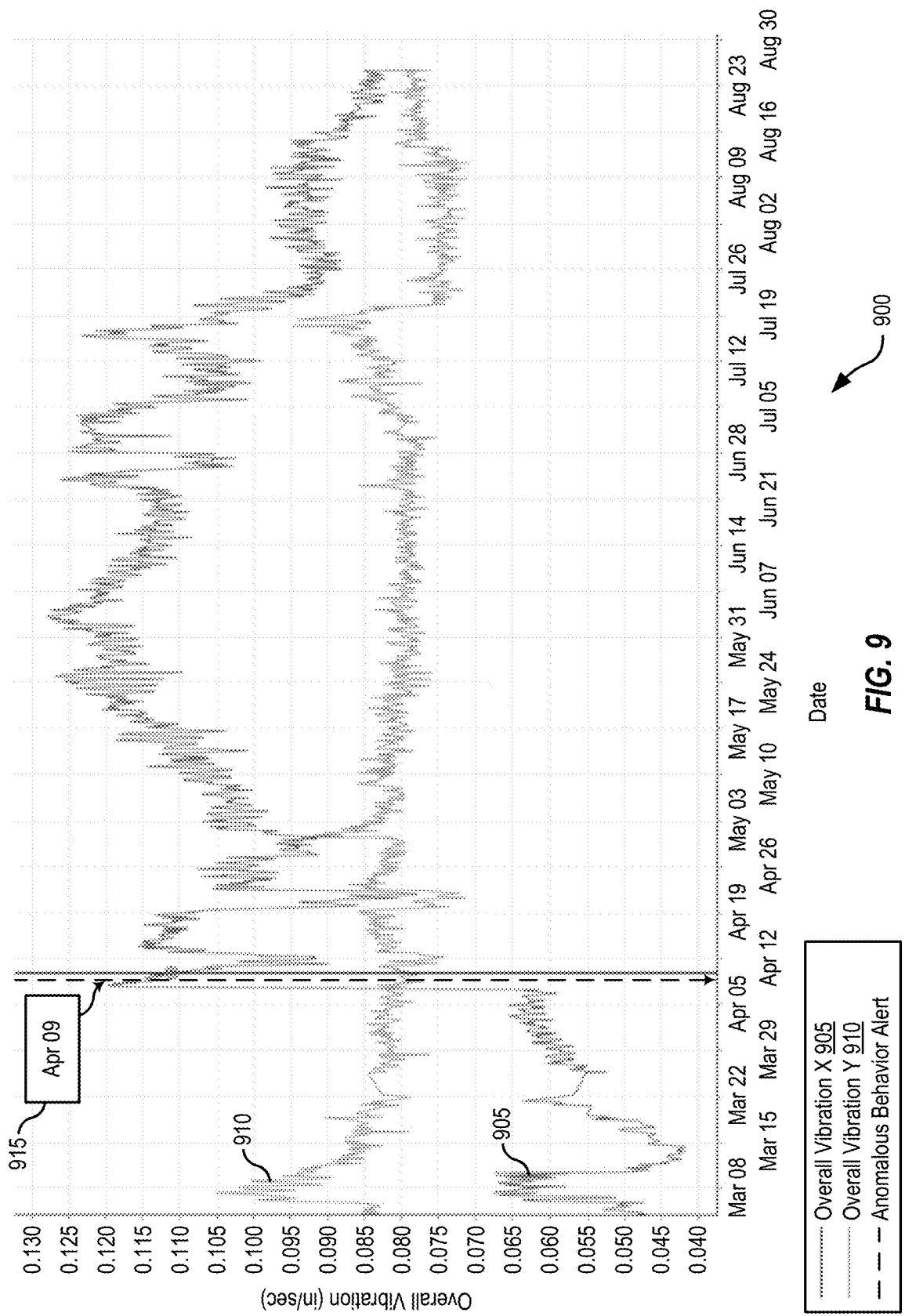
FIG. 9 shows a graph for an example dataset that supports analyzing machine performance, in accordance with aspects of the present disclosure.

FIG. 9 shows a graph 900 for an example dataset that supports analyzing machine performance, in accordance with aspects of the present disclosure. The example dataset shown in graph 900 includes a first group of vibration data 905 (indicated to be based on an x-axis vibration measurement) and a second group of vibration data 910 (indicated to be based on a y-axis vibration measurement). The graph 900 shows vibration data plotted according to measurements for an overall vibration (in units of in/sec) over time (in units given by dates ranging from March 8 to August 30). FIG. 9 provides an example of a "long-term catch" indicating that an anomaly associated with a long-term window was identified.

At 915, the graph 900 shows that an anomaly was detected on April 9. In this example, the anomaly at 915 was detected using the techniques described herein for analyzing vibrational performance. For example, the anomaly may have been detected based on one or more outliers detected in the dataset in the first group of vibration data 905 and/or the second group of vibration data 910, for example, based on a number of these detected outliers in a long-term window preceding the detection of the anomaly on April 9 (e.g., within 3,000 data points, which may correspond to approximately three months).

Additionally, the graph 900 of FIG. 9 does not show that these or any other anomalies were detected using techniques other than the techniques for analyzing vibrational performance as described herein. This may, although need not, indicate that the techniques described herein were able to determine the occurrence of the anomaly at 915 when other previously existing techniques may not have been able to do so.

FIG. 10 shows a graph 1000 for an example dataset that supports analyzing machine performance in accordance with aspects of the present disclosure. The example dataset shown in the graph 1000 includes a first group of vibration data 1005 (indicated to be based on an x-axis vibration measurement) and a second group of vibration data 1010 (indicated to be based on a y-axis vibration measurement). The graph 1000 shows vibration data plotted according to measurements for an overall vibration (in units of in/sec) over time (in units given by dates ranging from May 31 to August 23). FIG. 10 provides an example of a "long-term catch" indicating that an anomaly associated with a long-term window was identified.

At 1015, the graph 1000 shows that a first anomaly was detected on June 21. In this example, the first anomaly at 1015 was detected using the techniques described herein for analyzing vibrational performance. For example, the first anomaly may have been detected based on one or more outliers detected in the dataset in the first group of vibration data 1005 and/or the second group of vibration data 1010, for example, based on a number of these detected outliers in a long-term window preceding the detection of the first anomaly on June 21 (e.g., within 3,000 data points, which may correspond to approximately three months).

At 1020, the graph 1000 shows that a second anomaly was detected on August 5. In this example, the second anomaly at 1020 was detected using the techniques described herein for analyzing vibrational performance. For example, the second anomaly may have been detected based on one or more outliers detected in the dataset in the first group of vibration data 1005 and/or the second group of vibration data 1010, for example, based on a number of these detected outliers in a long-term window preceding the detection of the second anomaly on August 5 (e.g., within 3,000 data points, which may correspond to approximately three months).

Additionally, the graph 1000 of FIG. 10 does not show that these or any other anomalies were detected using techniques other than the techniques for analyzing vibrational performance as described herein. This may, although need not, indicate that the techniques described herein were able to determine the occurrence of the first anomaly at 1015 when other previously existing techniques may not have been able to do so. Moreover, an amplitude of the data points represented by the first group of vibration data 1005 and the second group of vibration data 1010 may be too low for at least some other techniques for analyzing vibrational performance, such as for root cause analysis (RCA) (e.g., the amplitudes of the data points within the first group of vibration data 1005 and the second group of vibration data 1010 are fully between 0.025 and 0.090 in/sec).

FIG. 11 shows a graph 1100 for an example dataset that supports analyzing machine performance in accordance with aspects of the present disclosure. The example dataset shown in the graph 1100 includes a first group of vibration data 1105 (indicated to be based on an x-axis measurement of acceleration) and a second group of vibration data 1110 (indicated to be based on a y-axis measurement of a height). The graph 1100 shows vibration data plotted according to measurements for an overall vibration (in units of in/sec) over time (in units given by dates ranging from March 1 to August 30). FIG. 11 provides an example of a "long-term catch" indicating that an anomaly associated with a long-term window was identified.

At 1115, the graph 1100 shows that an anomaly was detected on July 4. In this example, the anomaly at 1115 was detected using the techniques described herein for analyzing vibrational performance. For example, the anomaly may have been detected based on one or more outliers detected in the dataset in the first group of vibration data 1105 and/or the second group of vibration data 1110, for example, based on a number of these detected outliers in a long-term window preceding the detection of the anomaly on July 4 (e.g., within 3,000 data points, which may correspond to approximately three months). FIG. 11 also shows a first threshold 1150.

Additionally, the graph 1100 of FIG. 11 does not show that these or any other anomalies were detected using techniques other than the techniques for analyzing vibrational performance as described herein. This may, although need not, indicate that the techniques described herein were able to determine the occurrence of the anomaly at 1115 when other previously existing techniques may not have been able to do so. Moreover, an amplitude of the data points represented by the first group of vibration data 1105 and the second group of vibration data 1110 may be too low for at least some other techniques for analyzing vibrational performance, such as for RCA (e.g., the amplitudes of the data points within the first group of vibration data 1105 and the second group of vibration data 1110 are fully between 0.01 and 0.14 in/sec).

FIG. 12 shows a graph 1200 for an example dataset that supports analyzing machine performance in accordance with aspects of the present disclosure. The example dataset shown in the graph 1200 includes a first group of vibration data 1205 (indicated to be based on an x-axis measurement of acceleration) and a second group of vibration data 1210 (indicated to be based on a y-axis measurement of movement in the radial direction "R"). The graph 1200 shows vibration data plotted according to measurements for an overall vibration (in units of in/sec) over time (in units given by dates labeled from July 27 to August 25). FIG. 12 provides an example of a "short-term catch" indicating that an anomaly associated with a short-term window was identified.

At 1215, the graph 1200 shows that an anomaly was detected on August 11. In this example, the anomaly at 1215 was detected using the techniques described herein for analyzing vibrational performance. For example, the anomaly may have been detected based on one or more outliers detected in the dataset in the first group of vibration data 1205 and/or the second group of vibration data 1210, for example, based on a number of these detected outliers in a long-term window preceding the detection of the anomaly on August 11 (e.g., within 1,000 data points, which may correspond to approximately one month).

Additionally, at 1215 on August 11, the anomaly was detected via RCA, based on which an RCA alert was placed on the asset (e.g., a pump). At 1220, the graph 1200 shows that a "Hi Dynamic Alert" was also issued based on an anomaly detected on August 15. At 1225, the graph 1200 shows that a "HiHi Dynamic Alert" was also issued based on an anomaly detected on August 17. At 1230, on August 18, a further anomaly was detected via RCA, based on which a second RCA alert was placed on the asset. FIG. 12 also shows a first threshold 1250, a second threshold 1255, and a third threshold 1260. Any of the detected anomalies 1215, 220, 1225, and 1230 may have been detected based on satisfying any of the first threshold 1250, a second threshold 1255, and/or a third threshold 1260

FIG. 13 shows a graph 1300 for an example dataset that supports analyzing machine performance in accordance with aspects of the present disclosure. The example dataset shown in the graph 1300 includes a first group of vibration data 1305 (indicated to be based on a horizontal measurement of velocity) and a second group of vibration data 1310 (indicated to be based on a vertical measurement of velocity). The graph 1300 shows vibration data plotted according to measurements for a peak velocity (in units of in/sec) over time (in units given by dates labeled from July 27 to August 25). FIG. 13 provides an example of a "short-term catch" indicating that an anomaly associated with a short-term window was identified.

At 1315, the graph 1300 shows that an anomaly was detected on August 12. In this example, the anomaly at 1315 was detected using the techniques described herein for analyzing vibrational performance. For example, the anomaly may have been detected based on one or more outliers detected in the dataset in the first group of vibration data 1305 and/or the second group of vibration data 1310, for example, based on a number of these detected outliers in a long-term window preceding the detection of the anomaly on August 12 (e.g., within 1,000 data points, which may correspond to approximately one month).

Additionally, at 1320 on August 13, an anomaly (likely the same as the original anomaly detected at 1315) was detected via RCA. As shown here, RCA detected the anomaly the day after the techniques that were used to initially detect the anomaly at 1315 on August 12. Thus, assuming these anomalies to be related to the same underlying cause(c), the techniques provided herein detected the anomaly one day earlier than RCA.

At 1325, the graph 1300 shows that a "Hi Dynamic" alert was issued on August 17 based on an anomaly detected on August 12 and/or on August 13. FIG. 13 also shows a first threshold 1350, a second threshold 1355, and a third threshold 1360. Any of the detected anomalies 1315, 1320, and 1325 may have been detected based on satisfying any of the first threshold 1350, a second threshold 1355, and a third threshold 1360.

FIG. 14 shows a graph 1400 for an example dataset that supports analyzing machine performance in accordance with aspects of the present disclosure. The example dataset shown in the graph 1400 includes a first group of vibration data 1405 (indicated to be based on an x-axis measurement of peak acceleration) and a second group of vibration data 1410 (indicated to be based on a y-axis measurement of peak acceleration). The graph 1400 shows vibration data plotted according to measurements for a peak acceleration (in units of standard gravity (g)) over time (in units given by dates ranging from March 1 to August 30). FIG. 14 provides an example of a "short-term catch" indicating that an anomaly associated with a short-term window was identified.

At 1415, the graph 1400 shows that an anomaly was detected on July 8. In this example, the anomaly at 1415 was detected using the techniques described herein for analyzing vibrational performance. For example, the anomaly may have been detected based on one or more outliers detected in the dataset in the first group of vibration data 1405 and/or the second group of vibration data 1410, for example, based on a number of these detected outliers in a long-term window preceding the detection of the anomaly on July 8 (e.g., within 1,000 data points, which may correspond to approximately one month).

At 1425, the graph 1400 shows that a "Hi Dynamic" alert was issued on July 18 based on the anomaly detected on July 8 at 1415. Additionally, at 1425 on August 7, an anomaly (although potentially the same as the original anomaly detected at 1415) was detected via RCA. As shown here, RCA detected the anomaly 30 days after the techniques that were used to initially detect the anomaly at 1415 on July 8. Thus, if these anomalies are related to the same underlying cause(s), the techniques provided herein identified detected the anomaly 30 days earlier than RCA.

Figure 15:
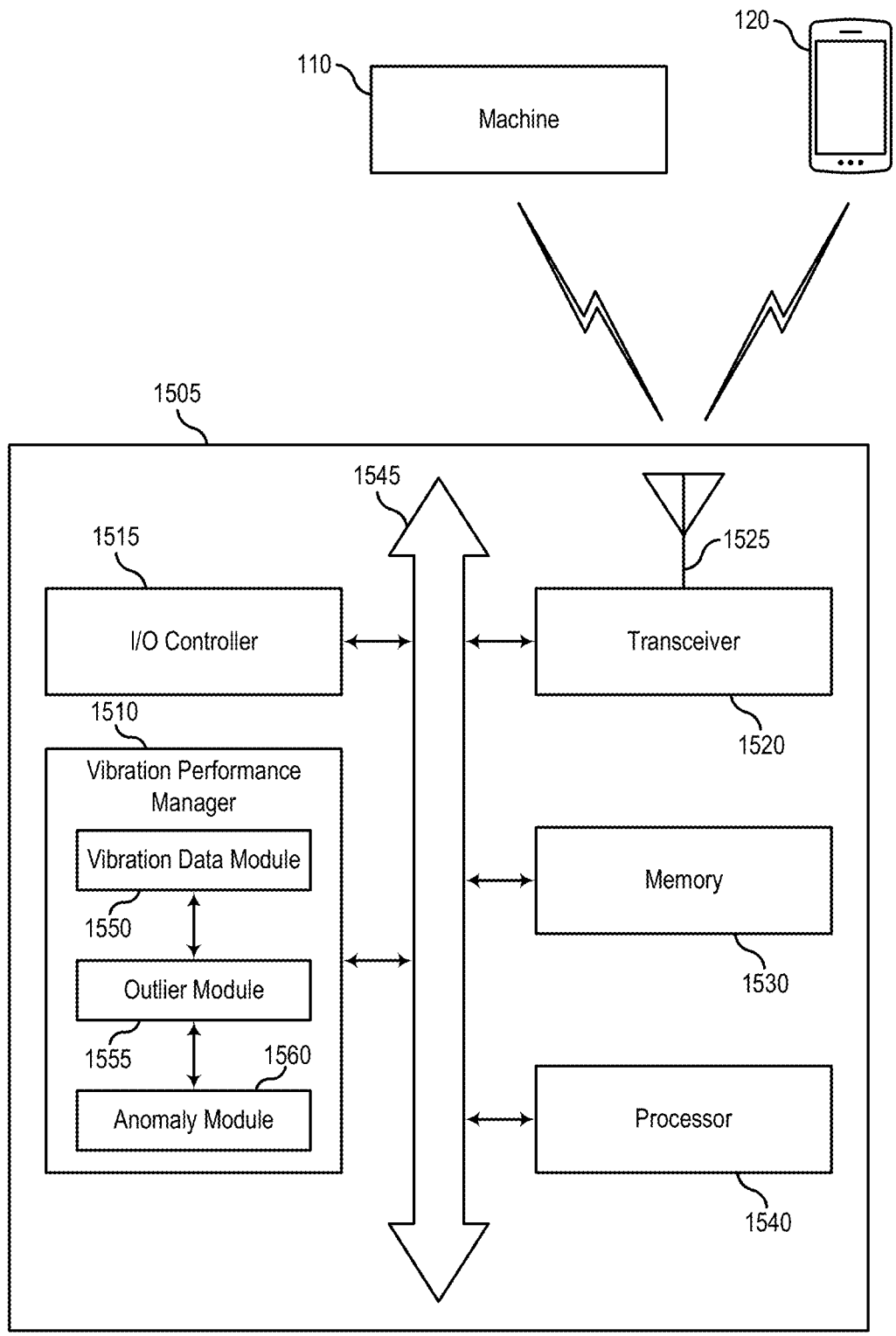
FIG. 15 shows a diagram of a system including a device that supports analyzing machine performance in accordance with aspects of the present disclosure.

FIG. 15 shows a diagram of a system 1500 including a device 1505 that supports analyzing machine performance, in accordance with aspects of the present disclosure. The device 1505 may be an example of or include the components of the device 105 as described with reference to FIG. 1 and as also described throughout FIGS. 2 through 14, or a server, UE, or other computing device. The device 1505 may include components for bi-directional voice and data communications including components for transmitting and receiving communications, including a vibrational performance manager 1510, an input/output (I/O) controller 1515, a transceiver 1520, an antenna 1525, memory 1530, and a processor 1540. These components may electronically communicate with one another via one or more buses 1545.

The vibrational performance manager 1510 may include multiple components that, in combination, facilitate the vibrational performance manager 1510 to receive and pre-process operational data, model the operational data to identify an anomaly and associate the anomaly with a corresponding sensor and/or machine 110 that may be experiencing an issue, and post-process the operational data to report this information to an operator of the system. More particularly, the vibrational performance manager 1510 may include a vibration data module 1550, an outlier module 1555, and an anomaly module 1560 which may provide each of these functions (and, e.g., may in some cases, be integrated circuit components of the vibrational performance manager 1510).

In some examples, the vibration data module 1550 may receive vibration data points from one or more sensors associated with one or more machines 110 (e.g., via one or more signals received from one or more machines 110 via the antenna 1525 and the transceiver 1520). In some examples, the vibration data points may include one or more of: a peak velocity value, a peak acceleration value, an overall root mean square value, an overall vibration value, or a combination thereof. In some examples, the vibration data module 1550 may collect the vibration data at discrete intervals.

The vibration data module 1550 may group the vibration data points into a first group of vibration data and a second group of vibration data, where the first group of vibration data may include a first set of the vibration data points associated with a short-term window and the second group of vibration data may include a second set of the vibration data points associated with a long-term window, each of the first group of vibration data and the second group of vibration data corresponding to one of a plurality of time intervals. In some examples, each time interval of the plurality of time intervals may correspond to a respective hour interval (e.g., according to an hourly periodicity). In some examples, the vibration data module 1550 may associate the vibration data points with respective ones of the one or more sensors based on a key associated with each of the vibration data points. In some examples, the key may include an indication of a location of a sensor, a sensor function, or both.

In some examples, grouping the vibration data points may include normalizing the vibration data of the first group of vibration data and the second group of vibration data.

In some examples, the vibration data module 1550 may modify the first set of vibration data points, the second set of vibration data points, or both, based on one or more performance parameters, where grouping the vibration data points may include filtering the vibration data points based on the modified data points. In some examples, the one or more performance parameters may include one or more of: a processed sensor measurement, a date-time indicator, an indicator type, a window size parameter, a number of processors, a sensitivity parameter, or a combination thereof. In some examples, the vibration data module 1550 may associate a plurality of indicators with each of the vibration data points, each indicator of the plurality of indicators being common to at least a subset of the one or more sensors. In some examples, the plurality of indicators may include one or more of: a sensor type, a corresponding machine 110, a corresponding facility, an indicator type, a date-time, a sensor measurement, or a combination thereof.

In some examples, the vibration data module 1550 may pass a set of information bits to the outlier module 1555, and the outlier module 1555 may receive the set of information bits from the vibration data module 1550, where the set of information bits may indicate the first and second groups of vibration data. In some examples, the outlier module 1555 may detect one or more outliers from the first set of vibration data points and from the second set of vibration data points (e.g., as the outlier module 1555 may have received from the vibration data module 1550).

In some examples, detecting the one or more outliers may be based on one or more of the plurality of indicators, respectively, for the first group of vibration data, the second group of vibration data, or both. In some examples, the outlier module 1555 detecting the one or more outliers may include the outlier module 1555 applying an isolation algorithm (e.g., an isolation forest algorithm) to the first set of vibration data points of the first group of vibration data and to the second set of vibration data points of the second group of vibration data. In some examples, the outlier module 1555 may determine a first subset of the one or more outliers based on an amplitude of each outlier of the first subset satisfying a first threshold. Likewise, the outlier module 1555 may determine a second subset of the one or more outliers based on an amplitude of each outlier of the second subset satisfying a second threshold. In some examples, the first threshold is set according to a threshold percentile for the first set of vibration data points of the short-term window and the second threshold is set according to the threshold percentile for the second set of vibration data points of the long-term window.

In some examples, the outlier module 1555 may pass a set of information bits to the anomaly module 1560, and the outlier module 1555 may receive the set of information bits from the anomaly module 1560, where the set of information bits may indicate the first and second subsets of the one or more outliers.

In some examples, the anomaly module 1560 may determine that the vibration data points include an anomaly associated with one or more respective sensors of the one or more sensors based on a quantity of outliers of the first subset that are within a detection window relative to a quantity of outliers of the second subset that are within the detection window. In some examples, determining that the vibration data points include the anomaly may be based on a variation between the quantity of outliers of the first subset that are within the detection window and the quantity of outliers of the second subset that are within the detection window. In some examples, the anomaly module 1560 may filter a list of the one or more machines 110 based on determining that the anomaly has not occurred at one or more respective sensors associated with the one or more machines 110, where the indication of the one or more respective sensors associated with the anomaly is based on the filtered list.

In some examples, the anomaly module 1560 may transmit an indication of the one or more respective sensors associated with the anomaly (e.g., via one or more signals transmitted to a UE 120 of a remote engineer via the antenna 1525 and the transceiver 1520). In some examples, the indication of the one or more respective sensors associated with the anomaly may be based on the filtered list.

The I/O controller 1515 may manage input and output signals for the device 1505. The I/O controller 1515 may also manage control of peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of the processor 1540. In some cases, a user may interact with the device 1505 via the I/O controller 1515 or via hardware components controlled by the I/O controller 1515.

The transceiver 1520 may communicate bi-directionally, for example, with one or more machines 110 (the machines 110 including one or more sensors, as described herein) at an industrial facility and with one or more wireless devices (e.g., a UE 120 belonging to a remote engineer, etc.) via one or more antennas, wired, or wireless links. For example, the transceiver 1520 may be or include a wireless transceiver and may communicate bidirectionally with another wireless transceiver. In some examples, the transceiver 1520 may include a modem to modulate data packets to provide the modulated data packets to the antennas for transmission and to demodulate packets received from the antennas.

In some examples, the antenna 1525 of the device 1505 may be or include a single antenna 1525. In some other examples, however, the device may include more than one antenna 1525, which may be capable of concurrently transmitting and receiving multiple wireless transmissions.

The memory 1530 may include RAM and ROM. The memory 1530 may store computer-readable, computer-executable software 1535 including instructions that, when executed, cause the processor 1540 to perform various functions described herein. In some examples, the memory 1530 may include, among other things, a basic input/output system (BIOS), which may control basic hardware or software operation such as the interaction with peripheral components or devices.

The processor 1540 may include one or more intelligent hardware devices (e.g., a general-purpose processor, a digital signal processor (DSP), a central processing unit (CPU), a microcontroller, an application-specific integrated circuit (ASIC), a field-programmable gate array (FPGA), a programmable logic device (PLD), a discrete gate or transistor logic component, a discrete hardware component, or any combination thereof). In some examples, the processor 1540 may be configured to operate a memory array using a memory controller. In other cases, the memory controller may be integrated into the processor 1540. The processor 1540 may be configured to execute computer-readable instructions stored in the memory 1530 to perform various functions (e.g., functions or tasks supporting enhanced reliability techniques for shared spectrum).

Figure 16:
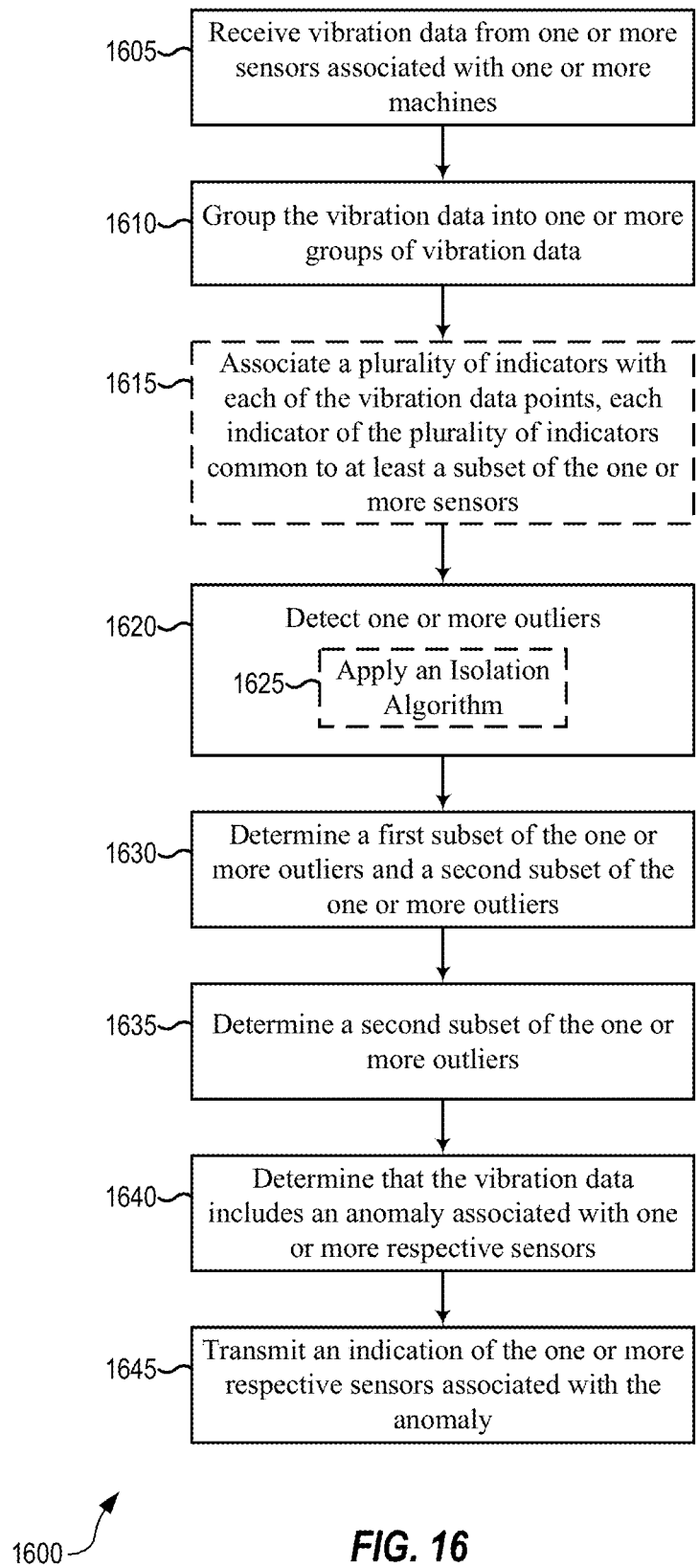
FIG. 16 shows a flowchart illustrating a method that supports analyzing machine performance in accordance with aspects of the present disclosure.

FIG. 16 shows a flowchart illustrating a method 1600 that supports analyzing machine performance in accordance with aspects of the present disclosure. The operations of the method 1600 may be implemented by a device, such as a server or other computing device, or its components. For example, the operations of the method 1600 may be performed by a vibration performance manager 1510 and its components, as described with reference to FIG. 15. In some examples, the device may execute a set of instructions to control the functional elements of the device to perform the functions described below. Additionally or alternatively, the device may perform aspects of the functions described below using special-purpose hardware.

At 1605, the device may receive vibration data points from one or more sensors associated with one or more machines. The operations of 1605 may be performed according to the methods described herein. In some examples, aspects of the operations of 1605 may be performed by a vibration data module 1550 as described with reference to FIG. 15.

At 1610, the device may group the vibration data points into a first group of vibration data and a second group of vibration data, where the first group of vibration data includes a first set of the vibration data points associated with a short-term window and the second group of vibration data includes a second set of the vibration data points associated with a long-term window. In some examples, each of the first group of vibration data and the second group of vibration data may correspond to one of a plurality of time intervals (e.g., one hour time intervals). The operations of 1610 may be performed according to the methods described herein. In some examples, aspects of the operations of 1610 may be performed by a vibration data module as described with reference to FIG. 15.

At 1615, the device may optionally associate a plurality of indicators with each of the vibration data points, each indicator of the plurality of indicators being common to at least a subset of the one or more sensors, where detecting one or more outliers is based on one or more of the plurality of indicators, respectively, for the first group of vibration data, the second group of vibration data, or both. The operations of 1615 may be performed according to the methods described herein. In some examples, aspects of the operations of 1615 may be performed by a vibration data module as described with reference to FIG. 15.

At 1620, the device may detect one or more outliers from the first set of vibration data points and from the second set of vibration data points. The operations of 1620 may be performed according to the methods described herein. In some examples, aspects of the operations of 1620 may be performed by an outlier module as described with reference to FIG. 15.

In some examples, at 1625, the device may, as part of the detecting one or more outliers, optionally apply an isolation algorithm to the first set of vibration data points of the first group of vibration data and to the second set of vibration data points of the second group of vibration data. The operations of 1625 may be performed according to the methods described herein. In some examples, aspects of the operations of 1625 may be performed by an outlier module as described with reference to FIG. 15.

At 1630, the device may determine a first subset of the one or more outliers based on an amplitude of each outlier of the first subset satisfying a first threshold. The operations of 1630 may be performed according to the methods described herein. In some examples, aspects of the operations of 1630 may be performed by an outlier module as described with reference to FIG. 15.

At 1635, the device may determine a second subset of the one or more outliers based on an amplitude of each outlier of the second subset satisfying a second threshold. The operations of 1635 may be performed according to the methods described herein. In some examples, aspects of the operations of 1635 may be performed by an outlier module as described with reference to FIG. 15.

At 1640, the device may determine that the vibration data points include an anomaly associated with one or more respective sensors of the one or more sensors based on a quantity of outliers of the first subset that are within a detection window relative to a quantity of outliers of the second subset that are within the detection window. The operations of 1640 may be performed according to the methods described herein. In some examples, aspects of the operations of 1640 may be performed by an anomaly module as described with reference to FIG. 15.

At 1645, the device may transmit an indication of the one or more respective sensors associated with the anomaly. The operations of 1645 may be performed according to the methods described herein. In some examples, aspects of the operations of 1645 may be performed by an anomaly module as described with reference to FIG. 15.

These and other aspects, features, and benefits of the claimed invention(s) are apparent from the following detailed written description of the preferred embodiments and aspects taken in conjunction with the following drawings, although variations and modifications thereto may be effected without departing from the spirit and scope of the novel concepts of the disclosure.

What is claimed is:

1. A method for analyzing machine performance, comprising:
   receiving vibration data points from one or more sensors associated with one or more machines;
   grouping the vibration data points into a first group of vibration data points and a second group of vibration data points, wherein the first group of vibration data comprises a first set of the vibration data points associated with a short-term window and the second group of vibration data comprises a second set of the vibration data points associated with a long-term window, each of the first group of vibration data and the second group of vibration data corresponding to one of a plurality of time intervals;
   detecting one or more outliers from the first set of vibration data points and from the second set of vibration data points;
   determining a first subset of the one or more outliers based on an amplitude of each outlier of the first subset satisfying a first threshold;
   determining a second subset of the one or more outliers based on an amplitude of each outlier of the second subset satisfying a second threshold;
   determining that the vibration data points comprise an anomaly associated with one or more respective sensors of the one or more sensors based on a quantity of outliers of the first subset that are within a detection window relative to a quantity of outliers of the second subset that are within the detection window; and
   transmitting an indication of the one or more respective sensors associated with the anomaly.

2. The method of claim 1, further comprising:
   associating a plurality of indicators with each of the vibration data points, each indicator of the plurality of indicators being common to at least a subset of the one or more sensors, wherein detecting the one or more outliers is based on one or more of the plurality of indicators, respectively, for the first group of vibration data, the second group of vibration data, or both.

3. The method of claim 2, wherein the plurality of indicators comprises one or more of: a sensor type, a corresponding machine, a corresponding facility, an indicator type, a date-time, a sensor measurement, or a combination thereof.

4. The method of claim 1, wherein the vibration data points comprise one or more of: a peak velocity value, a peak acceleration value, an overall root mean square value, an overall vibration value, or a combination thereof.

5. The method of claim 1, wherein grouping the vibration data points comprises:
   normalizing the vibration data of the first group of vibration data and the second group of vibration data.

6. The method of claim 1, wherein each time interval of the plurality of time intervals corresponds to a respective hour interval.

7. The method of claim 1, further comprising:
   modifying the first set of vibration data points, the second set of vibration data points, or both, based on one or more performance parameters, wherein grouping the vibration data points comprises filtering the vibration data points based on the modified data points.

8. The method of claim 7, wherein the one or more performance parameters comprise one or more of: a processed sensor measurement, a date-time indicator, an indicator type, a window size parameter, a number of processors, a sensitivity parameter, or a combination thereof.

9. The method of claim 1, wherein detecting the one or more outliers comprises:
   applying an isolation algorithm to the first set of vibration data points of the first group of vibration data and to the second set of vibration data points of the second group of vibration data.

10. The method of claim 1, wherein determining that the vibration data points comprise the anomaly is based on a variation between the quantity of outliers of the first subset that are within the detection window and the quantity of outliers of the second subset that are within the detection window.

11. The method of claim 1, wherein the first threshold is set according to a threshold percentile for the first set of vibration data points of the short-term window and the second threshold is set according to the threshold percentile for the second set of vibration data points of the long-term window.

12. The method of claim 1, further comprising:
    collecting the vibration data points at discrete intervals.

13. The method of claim 1, further comprising:
    associating the vibration data points with respective ones of the one or more sensors based on a key associated with each of the vibration data points.

14. The method of claim 13, wherein the key comprises an indication of a location of a sensor, a sensor function, or both.

15. The method of claim 1, further comprising:
    filtering a list of the one or more machines based on determining that the anomaly has not occurred at one or more respective sensors associated with the one or more machines, wherein the indication of the one or more respective sensors associated with the anomaly is based on the filtered list.

16. An apparatus for analyzing machine performance, comprising:
    a processor;
    memory coupled with the processor; and
    instructions stored in the memory and executable by the processor to cause the apparatus to:
       receive vibration data points from one or more sensors associated with one or more machines;
       group the vibration data points into a first group of vibration data points and a second group of vibration data points, wherein the first group of vibration data comprises a first set of the vibration data points associated with a short-term window and the second group of vibration data comprises a second set of the vibration data points associated with a long-term window, each of the first group of vibration data and the second group of vibration data corresponding to one of a plurality of time intervals;
       detect one or more outliers from the first set of vibration data points and from the second set of vibration data points;
       determine a first subset of the one or more outliers based on an amplitude of each outlier of the first subset satisfying a first threshold;
       determine a second subset of the one or more outliers based on an amplitude of each outlier of the second subset satisfying a second threshold;
       determine that the vibration data points comprise an anomaly associated with one or more respective sensors of the one or more sensors based on a quantity of outliers of the first subset that are within a detection window relative to a quantity of outliers of the second subset that are within the detection window; and transmit an indication of the one or more respective sensors associated with the anomaly.

17. The apparatus of claim 16, wherein the instructions are further executable by the processor to cause the apparatus to:

associate a plurality of indicators with each of the vibration data points, each indicator of the plurality of indicators being common to at least a subset of the one or more sensors, wherein detecting the one or more outliers is based on one or more of the plurality of indicators, respectively, for the first group of vibration data, the second group of vibration data, or both.

18. The apparatus of claim 17, wherein the plurality of indicators comprises one or more of: a sensor type, a corresponding machine, a corresponding facility, an indicator type, a date-time, a sensor measurement, or a combination thereof.

19. The apparatus of claim 16, wherein the vibration data points comprise one or more of: a peak velocity value, a peak acceleration value, an overall root mean square value, an overall vibration value, or a combination thereof.

20. The apparatus of claim 16, wherein the instructions to group the vibration data points are further executable by the processor to cause the apparatus to:

normalize the vibration data of the first group of vibration data and the second group of vibration data.

21. The apparatus of claim 16, wherein each time interval of the plurality of time intervals corresponds to a respective hour interval.

22. The apparatus of claim 16, wherein the instructions are further executable by the processor to cause the apparatus to:

modify the first set of vibration data points, the second set of vibration data points, or both, based on one or more performance parameters, wherein grouping the vibration data points comprises filtering the vibration data points based on the modified data points.

23. The apparatus of claim 22, wherein the one or more performance parameters comprise one or more of: a processed sensor measurement, a date-time indicator, an indicator type, a window size parameter, a number of processors, a sensitivity parameter, or a combination thereof.

24. The apparatus of claim 16, wherein the instructions to detect the one or more outliers are further executable by the processor to cause the apparatus to:

apply an isolation algorithm to the first set of vibration data points of the first group of vibration data and to the second set of vibration data points of the second group of vibration data.

25. The apparatus of claim 16, wherein the instructions to determine that the vibration data points comprise the anomaly are based on a variation between the quantity of outliers of the first subset that are within the detection window and the quantity of outliers of the second subset that are within the detection window.

26. The apparatus of claim 16, wherein the first threshold is set according to a threshold percentile for the first set of vibration data points of the short-term window and the second threshold is set according to the threshold percentile for the second set of vibration data points of the long-term window.

27. The apparatus of claim 16, wherein the instructions are further executable by the processor to cause the apparatus to:

collect the vibration data points at discrete intervals.

28. The apparatus of claim 16, wherein the instructions are further executable by the processor to cause the apparatus to:

associate the vibration data points with respective ones of the one or more sensors based on a key associated with each of the vibration data points.

29. The apparatus of claim 28, wherein the key comprises an indication of a location of a sensor, a sensor function, or both.

30. The apparatus of claim 16, wherein the instructions are further executable by the processor to cause the apparatus to:

filter a list of the one or more machines based on determining that the anomaly has not occurred at one or more respective sensors associated with the one or more machines, wherein the indication of the one or more respective sensors associated with the anomaly is based on the filtered list.

\* \* \* \* \*